United States Patent
Xiu et al.

(10) Patent No.: US 12,167,035 B2
(45) Date of Patent: *Dec. 10, 2024

(54) HYBRID CUBEMAP PROJECTION FOR 360-DEGREE VIDEO CODING

(71) Applicant: InterDigital VC Holdings, Inc., Wilmington, DE (US)

(72) Inventors: Xiaoyu Xiu, San Diego, CA (US); Yuwen He, San Diego, CA (US); Yan Ye, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,234

(22) Filed: Feb. 21, 2023

(65) Prior Publication Data
US 2023/0199219 A1   Jun. 22, 2023

Related U.S. Application Data

(63) Continuation of application No. 17/131,902, filed on Dec. 23, 2020, now Pat. No. 11,616,981, which is a
(Continued)

(51) Int. Cl.
*H04N 19/597* (2014.01)
*G06T 3/00* (2024.01)
(Continued)

(52) U.S. Cl.
CPC ............. *H04N 19/597* (2014.11); *G06T 3/16* (2024.01); *H04N 19/12* (2014.11); *H04N 19/61* (2014.11)

(58) Field of Classification Search
CPC ...... H04N 19/597; H04N 19/12; H04N 19/61; H04N 19/593; H04N 19/563; H04N 19/119; G06T 3/0087; G06T 15/00
See application file for complete search history.

(56) References Cited

U.S. PATENT DOCUMENTS

| 6,072,496 A | 6/2000 | Guenter et al. |
| 2004/0105597 A1 | 6/2004 | Lelescu et al. |

(Continued)

FOREIGN PATENT DOCUMENTS

| CN | 102196221 A | 9/2011 |
| WO | 2016/115343 A2 | 7/2016 |

OTHER PUBLICATIONS

Abbas, Adeel, "GoPro Test Sequences for Virtual Reality Video Coding", JVET-C0021, GoPro, Joint Video Exploration Team (JVET) of ITU-T SG 16 WP 3 and ISO/IEC JTC 1/SC 29/WG 11, 3rd Meeting: Geneva, CH, May 26-31, 2016, 10 pages.
(Continued)

*Primary Examiner* — Nam D Pham
(74) *Attorney, Agent, or Firm* — Xiaoan Lu

(57) ABSTRACT

A system, method, and/or instrumentality may be provided for coding a 360-degree video. A picture of the 360-degree video may be received. The picture may include one or more faces associated with one or more projection formats. A first projection format indication may be received that indicates a first projection format may be associated with a first face. A second projection format indication may be received that indicates a second projection format may be associated with a second face. Based on the first projection format, a first transform function associated with the first face may be determined. Based on the second projection format, a second transform function associated with the second face may be determined. At least one decoding process may be performed on the first face using the first transform function and/or at least one decoding process may be performed on the second face using the second transform function.

34 Claims, 26 Drawing Sheets

Related U.S. Application Data continuation of application No. 16/616,691, filed as application No. PCT/US2018/034404 on May 24, 2018, now Pat. No. 10,904,571.

(60) Provisional application No. 62/526,781, filed on Jun. 29, 2017, provisional application No. 62/511,315, filed on May 25, 2017.

(51) Int. Cl.
  G06T 3/16 (2024.01)
  H04N 19/12 (2014.01)
  H04N 19/61 (2014.01)

(56) References Cited

U.S. PATENT DOCUMENTS

| | | |
|---|---|---|
| 2006/0103648 A1 | 5/2006 | Wu et al. |
| 2010/0085425 A1 | 4/2010 | Tan |
| 2011/0210967 A1 | 9/2011 | Suzuki et al. |
| 2017/0094262 A1 | 3/2017 | Peterson et al. |
| 2020/0084428 A1* | 3/2020 | Oh .................... H04N 21/2343 |

OTHER PUBLICATIONS

Bang et al., "Description of 360 3D Video Application Exploration Experiments on Divergent Multi-View Video", ISO/IEC JTC1/SC29/WG11 MPEG2015/ M16129, Requirements, San Diego, US, Feb. 2016, 5 pages.

Bossen et al., "JEM Software Manual", JCTVC-Software Manual, AHG chairs, Joint Collaborative Team on Video Coding (JCT-VC) of ITU-T SG16 WP3 and ISO/IEC JTC1/SC29/WG11, 2016, pp. 1-29.

Boyce, Jill, "Omnidirectional Projection Indication SEI Message Geometry_Type and Projection Type Changes", Joint Collaborative Team on Video Coding (JCT-VC) of ITU-T SG16 WP3 and ISO/IEC JTC1/SC29/WG11, 27th Meeting: Hobart, AU, Intel, JCTVC-AA0035r1, Mar. 31-Apr. 7, 2017, 10 pages.

Carbotte, Kevin, "Google Looks to Solve VR Video Quality Issues with Equi-Angular Cubemaps (EAC)", Tom's Hardware, Available at: <URL:https://www.tomshardware.com/news/google-equi-angulra-cubemap-projection-technology,33917.html> Retrieved on Nov. 19, 2019, Mar. 15, 2017, pp. 1-8.

Choi, Byeongdoo, "Technologies under Consideration for Omnidirectional Media Application Format", Systems Subgroup, ISO/IEC JTC1/SC29/WG11 N15946, San Diego, CA, US, Feb. 2016, 16 pages.

Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.

Facebook360, "Facebook 360 Video", Available at <https://facebook360.fb.com/>, pp. 1-5.

Github, "Facebook's Equirectangular to Cube Map Tool on GitHub", Transform 360, Available at <https://github.com/facebook/transform?files=1>, pp. 1-3.

Google VR, "Google Cardboard", Available at <https://www.google.com/get/cardboard/>, pp. 1-4.

Hanhart et al., "AHG8: High Level Syntax Extensions for Signaling of 360-Degree Video Information", JVET-D0093, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

Hanhart et al., "AHG8: Reference Samples Derivation using Geometry Padding for Intra Coding", JVET-D0092, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

He, Yuwen et al., "AHG8: Algorithm Description of Projection Format Conversion in 360Lib", Joint Video Exploration Team (JVET) of ITU-T SG 16 WP 3 and ISO/IEC JTC1/SC 29/WG 11, 5th Meeting: Geneva, CH, InterDigital Communications Inc., Samsung Electronics Co. Ltd., MediaTek Inc., Zhejiang University, Qualcomm Inc., OwlReality, JVET-E0084, Jan. 12-20, 2017, 15 pages.

He, Yuwen et al., "AHG8: Geometry Padding for 360 Video Coding", Joint Video Exploration Team (JVET) of ITU-T SG 16 WP 3 and ISO/IEC JTC1/SC 29/WG 11, 4th Meeting: Chengdu, CN, InterDigital Communications Inc., JVET-D0075, Oct. 15-21, 2016, 10 pages.

Ho et al., "Unicube for Dynamic Environment Mapping", IEEE Transactions on Visualization and Computer Graphics, vol. 17, No. 1, Jan. 2011, pp. 51-63.

HTC, "HTC Vive", Available at <https://www.htcvive.com/us/>, pp. 1-3.

ISO/IEC, "Requirements for OMAF", Requirements, ISO/IEC JTC1/SC29/WG11 N16143, San Diego, CA, US, Feb. 2016, 2 pages.

ITU-T, "High Efficiency Video Coding", H.265, Series H: Audiovisual and Multimedia Systems, Infrastructure of Audiovisual Services— Coding of Moving Video, Apr. 2013, 317 pages.

Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.

Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.

Oculus, "Oculus Rift", Available at <https://www.oculus.com/en-us/rift/>, pp. 1-19.

Oh, Sejin et al., "SEI Message for Signaling of 360-Degree Video Information", Joint Collaborative Team on Video Coding (JCT-VC) of ITU-T SG WP 3 and ISO/IEC JTC 1/SC 29/WG 11, 26th Meeting: Geneva, CH, LG Electronics, JCTVC-Z0026, Jan. 12-20, 2017, 6 pages.

Sun et al., "WS-PSNR for 360 Video Quality Evaluation", Zhejiang University, ISO/IEC JTC1/SC29/WG11 MPEG2016/M38551, Geneva, CH, May 2016, 3 pages.

Thomas et al., "5G and Future Media Consumption", TNO, ISO/IEC JTC1/SC29/WG11 MPEG2016/m37604, San Diego, CA, US, Feb. 2016, 10 pages.

Wenjie et al., "Design and Research on Projector-Camera Interactive System Based on SOPC", A Dissertation Submitted to Guangdong University of Technology for the Degree of Master of Engineering Science, School of Information Engineering, Guangdong University of Technology, May 2013, 72 pages.

Wien et al., "Preliminary Joint Call for Evidence on Video Compression with Capability Beyond HEVC", JVET-E1002, JVET, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-9.

Wikipedia, "Optical Flow", Available at <URL:https://en.wikipedia.org/wiki/Optical_flow>, Oct. 18, 2019, pp. 1-5.

Yin et al., "3D Shape Reconstruction System with Feature Projection via Stereo Light Microscope", 2009 Ninth International Conference on Electronic Measurement & Instruments, Oct. 2009, 4 pages.

Yip, Eric et al., "Technologies under Consideration for ISO/IEC 23000-20 Omnidirectional Media Application Format", ISO/IEC JTC1/SC29/WG11 MPEG 2017/W16637, Geneva, Switzerland, Jan. 2017, 50 pages.

Yu et al., "A Framework to Evaluate Omnidirectional Video Coding Schemes", IEEE International Symposium on Mixed and Augmented Reality, Sep. 29-Oct. 3, 2015, pp. 31-36.

* cited by examiner

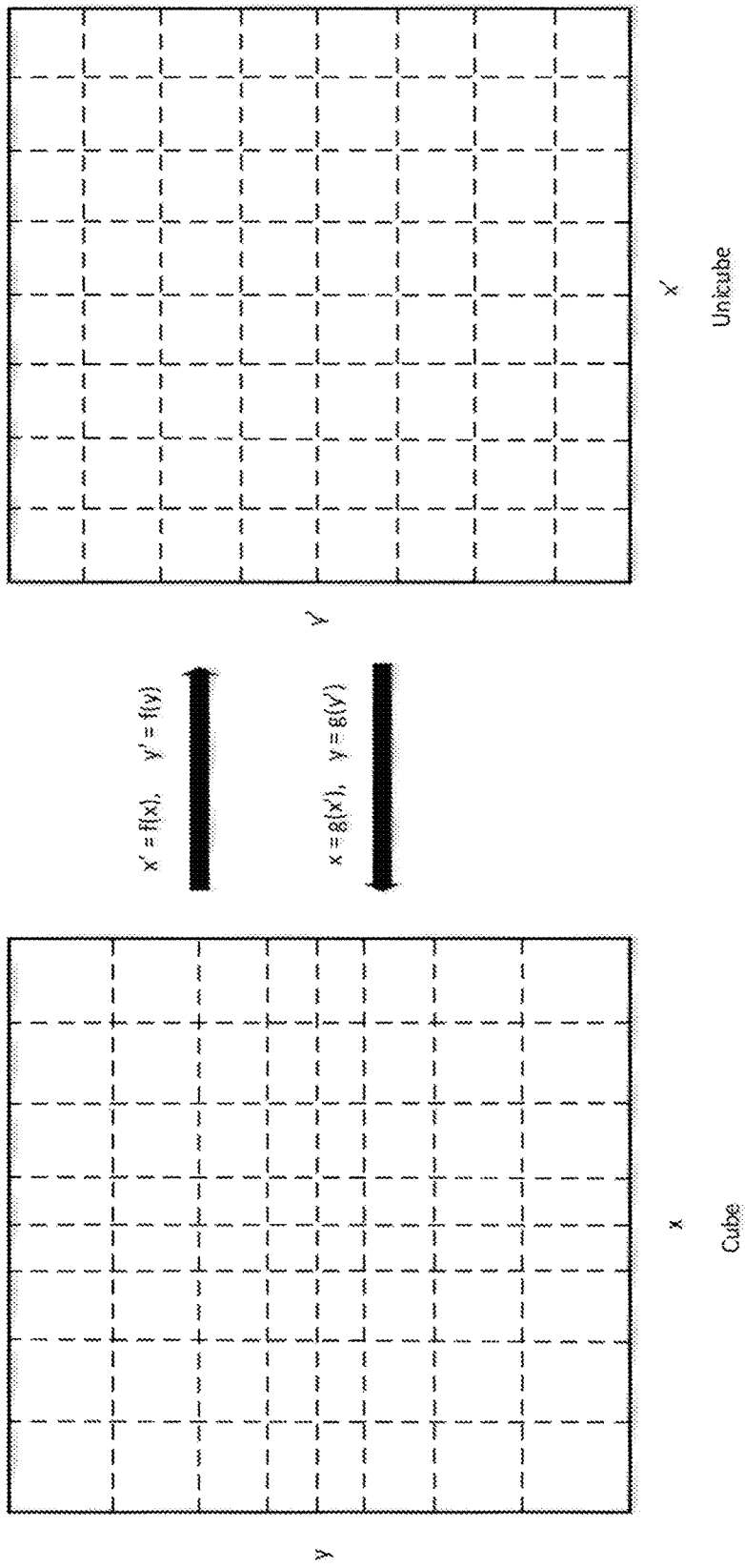

HYBRID CUBEMAP PROJECTION FOR 360-DEGREE VIDEO CODING

CROSS-REFERENCE

This application is a continuation application of U.S. patent application Ser. No. 17/131,902, filed Dec. 23, 2020, which is a continuation application of U.S. patent application Ser. No. 16/616,691, filed Nov. 25, 2019, now U.S. Issued U.S. Pat. No. 10,904,571, which is the National Stage Entry under 35 U.S.C. § 371 of Patent Cooperation Treaty Application No. PCT/US2018/034404, filed May 24, 2018, which claims the benefit of U.S. Provisional Application No. 62/511,315, filed on May 25, 2017; and U.S. Provisional Application No. 62/526,781, filed on Jun. 29, 2017, all of which are hereby incorporated herein by reference as if fully set forth.

BACKGROUND

Virtual reality (VR) is increasingly entering our daily lives. VR has many application areas, including healthcare, education, social networking, industry design/training, gaming, movies, shopping, entertainment, etc. VR is gaining attention from industries and consumers because VR can bring an immersive viewing experience. VR creates a virtual environment surrounding the viewer and generates a true sense of being there for the viewer. Providing the full real feeling in the VR environment is important for a user's experience. For example, the VR system may support interactions through posture, gesture, eye gaze, voice, etc. To allow the user to interact with objects in the VR world in a natural way, the VR may provide haptic feedback to the user.

SUMMARY

A system, method, and/or instrumentality may be provided for processing video data. Processing video data may include customizing a transform function for a face or for a direction. The transform function may be customized based on a video content. A cube mapping may be converted into another spherical mapping, for example, using the transform function. The transform function may be a polynomial model. The transform function may be applied for a 2D-to-3D mapping.

A 360-degree video may be coded (e.g., decoded). A picture of the 360-degree video may be received. The picture may include one or more faces, for example, associated with one or more projection formats. A first projection format indication may be received, for example, that indicates a first projection format may be associated with a first face. A second projection format indication may be received, for example, that indicates a second projection format may be associated with a second face. Based on the first projection format, a first transform function associated with the first face may be determined. Based on the second projection format, a second transform function associated with the second face may be determined. At least one decoding process may be performed on the first face, for example, using the first transform function. At least one decoding process may be performed on the second face, for example, using the second transform function.

The first projection format may be different than the second projection format. Performing the decoding process on the first face (e.g., using the first transform function) may include converting the first face of the picture to a target geometry based on the first transform function and/or performing geometry padding of reference samples of the face based on the first transform function.

The first projection format and/or the second projection format may include one or more of a cubemap (CMP) format, a uni-cube map projection (UNICMP) format, an adjusted cube map projection (ACP) format, or an equiangular cubemap projection (EAC) format. The projection format indication (e.g., the first projection format indication) may be an index value associated with a preconfigured projection format. The first projection format indication and/or the second projection format indication may be received at a sequence level and/or a picture level.

A determination of whether the first face is in a user-defined projection format may be performed. The determination of whether the first face is in a user-defined projection format may be based on the first projection format indication. For example, based on a determination that the first face is in the user-defined projection format, a horizontal transform function coefficient may be received for a horizontal direction of the first face and/or a vertical transform function coefficient may be received for a vertical direction of the first face.

A 360-degree video may be coded (e.g., decoded). For example, a picture of the 360-degree video may be received. The picture may include a face and/or a projection format corresponding to the face. A determination of whether the face is in a user-defined projection format may be performed, for example, based on a projection format indication associated with the face. A horizontal transform function coefficient may be determined for a horizontal direction of the face and/or a vertical transform function coefficient may be determined for a vertical direction of the face, for example, based on the face being in the user-defined projection format. A horizontal transform function associated with the face may be determined, for example, based on the horizontal transform function coefficient. A vertical transform function associated with the face may be determined, for example, based on the vertical transform function coefficient. One or more decoding processes may be performed on the face, for example, using the horizontal transform function and/or the vertical transform function. The decoding process may include performing a geometry padding of reference samples of the face.

A determination of whether a boundary continuity constraint is associated with the face may be performed. A number of bits on the face may be reduced, for example, based on the boundary continuity constraint being associated with the face. The number of bits on the face may be reduced by one or more of sharing transform function coefficients for a vertical mapping of the face and one or more other faces in a top face row, and/or by sharing the transform function coefficients for the vertical mapping of the face and at least one other face, for example, in a bottom face row in a frame packing layout. The determination of whether the boundary continuity constraint is associated with the face may be based on a received signal.

Content may be identified. The content may be 360-degree video content. The content may be represented as a sphere geometry structure, for example, including at least one of a cubemap projection (CMP) format and a CMP-like format. A projection face may be identified from one or more projection faces of the content. One or more projection formats may be identified. One or more (e.g., each) of the projection formats may include a spherical sampling characteristic.

A projection format may be determined (e.g., from the projection formats), for example, for representing the content on the projection face. The projection format may be determined based on a characteristic of content provided on the projection face and/or the spherical sampling characteristic of the projection format. The content may be represented on the projection face via the determined projection format.

One or more other projection faces may be identified from the projection faces of the content. One or more other projection formats may be determined for representing the content the other projection faces. The projection format determined for representing the content on the other projection face may be different than the projection format determined for representing the content on the projection face. The content may be represented on the other projection face via the determined other projection format.

The projection format for representing the content on the projection face may include a CMP format, a uni-cube map projection (UNICMP) format, an adjusted cube map projection (ACP) format, and/or an equi-angular cubemap projection (EAC) format. The projection format for representing the content on the projection face may be determined to be the CMP format, for example, based on the characteristic of the content projected on the projection face including objects with complex textures around a boundary of the projection face.

The projection format for representing the content on the projection face may be determined to be a unicube map projection (UNICMP), an adjusted cube map projection (ACP), and/or an equi-angular cubemap projection (EAC) projection format, for example, based on the characteristic of the content projected on the projection face including objects with complex textures at a region at a center of the projection face. One or more (e.g., each) of the projection formats may include a spherical sampling characteristic that may be different than the spherical sampling characteristic of one or more other projection formats.

Content may be identified. The content may be 360-degree video content. The content may be represented as a sphere geometry structure including one or more of a cubemap projection (CMP) format and a CMP-like format. A projection face may be identified from one or more projection faces of the content. One or more projection formats may be identified. The projection formats (e.g., each of the projection formats) may include a spherical sampling characteristic. One or more transform functions may be identified. The transform functions (e.g., each of the transform functions) may assign a first spherical sampling density near a boundary of the projection face and a second spherical sampling density near a center of the projection face.

A projection format may be determined for representing the content on the projection face. The projection format may be determined based on a characteristic of content provided on the projection face and/or the spherical sampling characteristic of the projection format. A transform function may be determined for representing the content on the projection face. The transform function may be determined based on the characteristic of the content provided on the projection face, the first spherical sampling density assigned near the boundary of the projection face, and/or the second spherical sampling density assigned near the center of the projection face. The content may be represented on the projection face via at least one of the determined projection format and the determined transform function.

One or more other projection faces may be identified. For example, another projection format may be determined for representing the content on another projection face. The projection format determined for representing the content on the other projection face may be different than the projection format determined for representing the content on the projection face. The content may be represented on the other projection face via the determined other projection format.

Another projection face may be identified from the projection faces of the content. Another transform function may be determining for representing the content on the other projection face. The transform function determined for representing the content on the other projection face may be different than the transform function determined for representing the content on the projection face. The content on the other projection face may be represented via the determined other transform function.

The transform function for representing the content on the projection face may be determined to be a transform function assigning a lower spherical sampling density at the boundary of the projection face and/or a higher spherical sampling density at the center of the projection face based on, for example, the characteristic of the content projected on the projection face including objects with complex textures around at the center of the projection face.

A third transform function may be determining for representing the content on the projection face. The third transform function may be determined based on the characteristic of the content provided on a horizontal direction of the projection face. A fourth transform function may be determined for representing the content on the projection face. The fourth transform function may be determined based on the characteristic of the content provided on a vertical direction of the projection face. The content may be represented on the projection face via the third transform function and the fourth transform function. The transform function may be a polynomial model. The transform function may be applied for a 2D-to-3D and 3D-to-2D mapping.

BRIEF DESCRIPTION OF THE DRAWINGS

A more detailed understanding may be had from the following description, given by way of example in conjunction with the accompanying drawings wherein:

FIG. 4A shows an example mapping from the non-uniform partition grid of a cube face to the uniform partition grid of a unicube face.

FIG. 4B shows an example mapping from the uniform partition grid of a unicube face to the non-uniform partition grid of a cube face.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

VR systems may use 360-degree video to provide the users the capability to view the scene from 360-degree angles in the horizontal direction and 180-degree angles in the vertical direction. VR and 360-degree video may be the direction for media consumption beyond Ultra High Definition (UHD) service. Work on the requirements and potential technologies for omnidirectional media application format may be performed to improve the quality of 360-degree video in VR and/or to standardize the processing chain for client's interoperability. Free view TV (FTV) may test the performance of one or more of the following: (1) 360-degree video (omnidirectional video) based system; (2) multi-view based system.

The quality and/or experience of one or more aspects in the VR processing chain may be improved. For example, the quality and/or experience of one or more aspects in capturing, processing, display, etc., VR processing may be improved. On the capturing side, VR may use one or more cameras to capture a scene from one or more (e.g., different) divergent views (e.g., 6-12 views). The views may be stitched together to form a 360-degree video in high resolution (e.g. 4K or 8K). On the client side and/or the user side, the virtual reality system may include a computation platform, head mounted display (HMD), and/or head tracking sensors. The computation platform may be in charge of receiving and/or decoding 360-degree video, and/or generating the viewport for display. Two pictures, one for each eye, may be rendered for the viewport. The two pictures may be displayed in HMD (e.g., for stereo viewing). The lens may be used to magnify the image displayed in HMD for better viewing. The head tracking sensor may keep (e.g., constantly keep) track of the viewer's head orientation, and/or may feed the orientation information to the system to display the viewport picture for that orientation.

VR systems may provide a touch device for a viewer to interact with objects in the virtual world. VR systems may be driven by a powerful workstation with good GPU support. A light VR system (e.g., Gear VR) may use a smartphone as computation platform, HMD display, and/or head tracking sensor. The spatial HMD resolution may be 2160×1200, refresh rate may be 90 Hz, and/or the field of view (FOV) may be 110 degrees. The sampling density for head tracking sensor may be 1000 Hz, which may capture fast movement. A VR system may include a lens and/or cardboard, and/or may be driven by smartphone.

Figure 1:
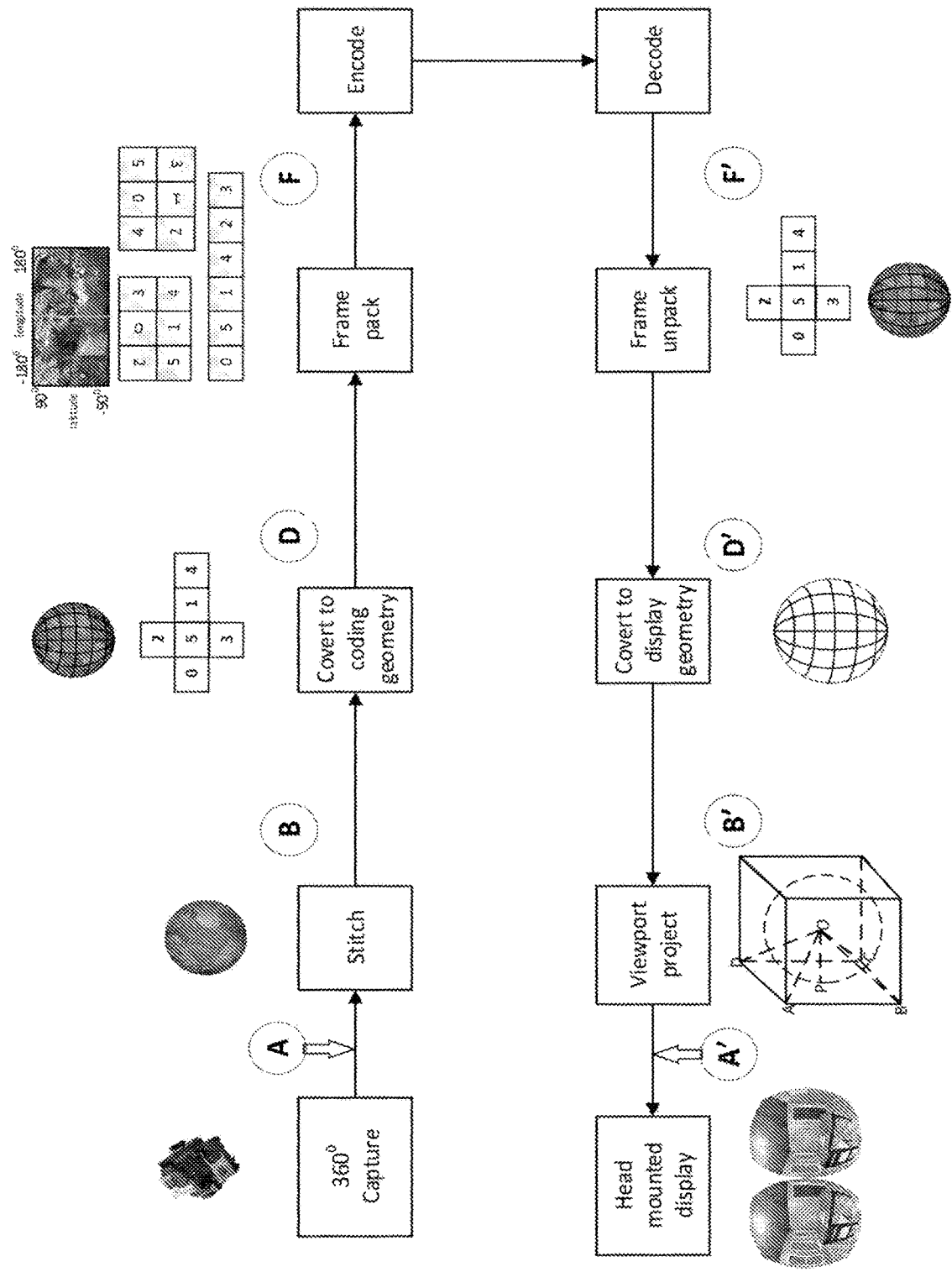
FIG. 1 shows an example workflow of a 360-degree video system.

An example workflow for 360-degree video system may be illustrated in FIG. 1. The example workflow for 360-degree video system may include a 360-degree video capturing implementation which may use one or more cameras to capture videos covering the sphere (e.g., the entire sphere). The videos may be stitched together in a native geometry structure. For example, the videos may be stitched together in an equirectangular projection (ERP) format. The native geometry structure may be converted to one or more projection formats for encoding, based on the existing video codecs. At the receiver, the video may be decoded and/or the decompressed video may be converted to the geometry for display. The video may be used for rendering via viewport projection according to user's viewing angle.

Figure 2A:
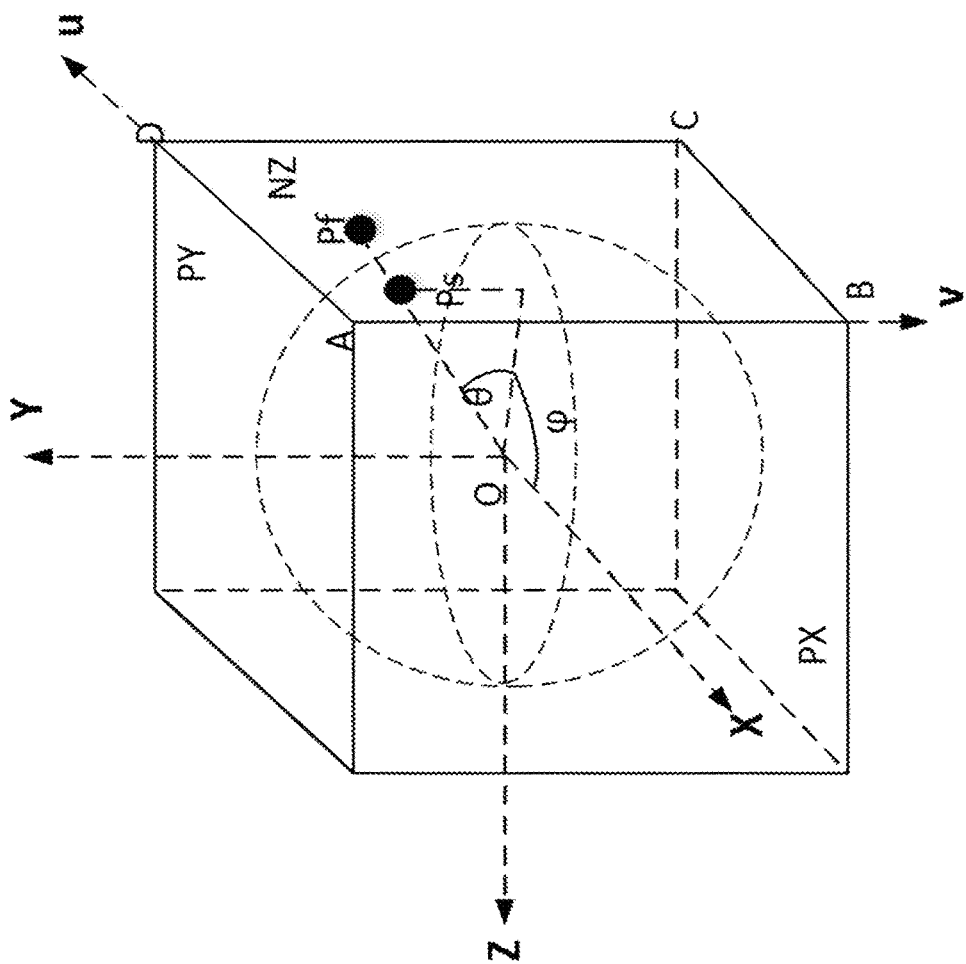
FIG. 2A shows a CMP example 3D geometry structure.

Cube map projection of 360-degree video may be performed. A 360-degree video compression and/or delivery system may be performed. 360-degree video delivery may represent the 360-degree information using a sphere geometry structure. For example, synchronized views captured by one or more cameras may be stitched on the sphere as an integral structure. The sphere information may be projected to a 2D planar surface with a given geometry conversion. A spherical mapping format may be a cube map projection (CMP) format. FIG. 2A shows an example projective geometry of the CMP format.

Figure 2B:
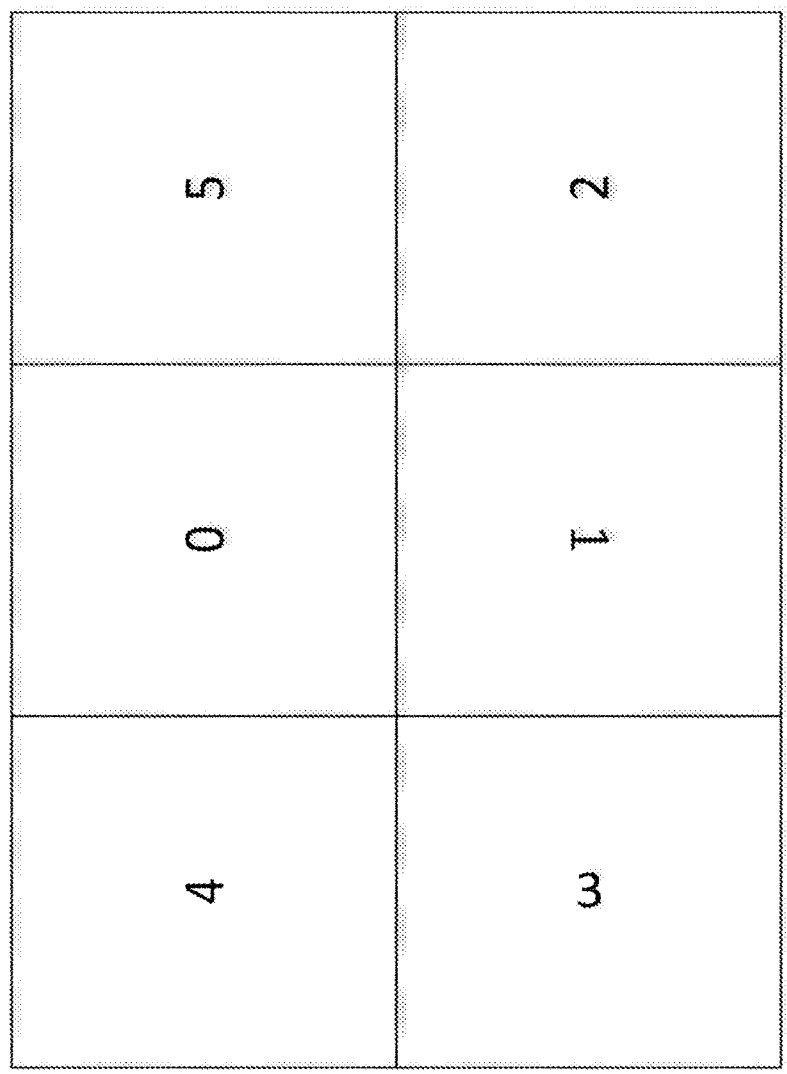
FIG. 2B shows a CMP example 2D planar for 6 faces.
Figure 2C:
FIG. 2C shows an example projective picture with CMP.

Video codec may not be designed to handle sphere video. If video codec is not designed to handle sphere video, the 6 faces of CMP format may be packed together into a picture (e.g., a single picture). To maximize the continuity between neighboring faces, one or more faces may be rotated by a predefined degree. FIG. 2B shows an example packing which may place the 6 faces into a rectangular picture. In FIG. 2B, a face index may be put in the direction that is aligned with the corresponding rotation of the face (e.g., for better visualization). For example, face #3 and/or #1 may be rotated counter-clockwise by 270 and 180 degrees, respectively, while one or more (e.g., all) of the other faces may not rotated. An example picture with CMP may be shown in FIG. 2C. The resulting motion field (which may describe the temporal correlation between neighboring 2D projective pictures) generated by CMP may be represented by the translational motion model of video codecs, for example, due to its rectilinear structure.

Unicube map projection for 360-degree video coding may be performed.

The CMP format may be a favorable choice over one or more spherical mapping formats for 360-degree video representation, for example, due to its computational efficiency. Due to the limitation of the rectilinear projection, the samples on the sphere may be unevenly sampled by the CMP format with a higher sampling density near face boundaries and/or a lower sampling density near face centers. Non-uniform spherical sampling may penalize the efficiency of 360-degree video representation and/or may reduce the efficiency of 360-degree video coding, for example, because the existing coding may be built upon the assumption that one or more (e.g., all) of the samples on the planar picture may be important (e.g., equally important). The non-uniform sampling of the CMP may result in the quality of the regions around the face boundaries being higher than that of the regions around the face centers when 360-degree video is coded by existing video codecs. The samples on the sphere may not have the same importance with respect to a viewer's visual experience. For example, viewers may be more likely to view the content in the vicinity of the face centers than the face boundaries. Having different sampling densities may cause wrapping and/or deformation of an object as it moves from the center of the face to the face boundary (or vice versa) in the temporal domain. Object wrapping may decrease the effectiveness of motion compensated prediction and/or may reduce the coding efficiency of 360-degree video.

Figure 3A:
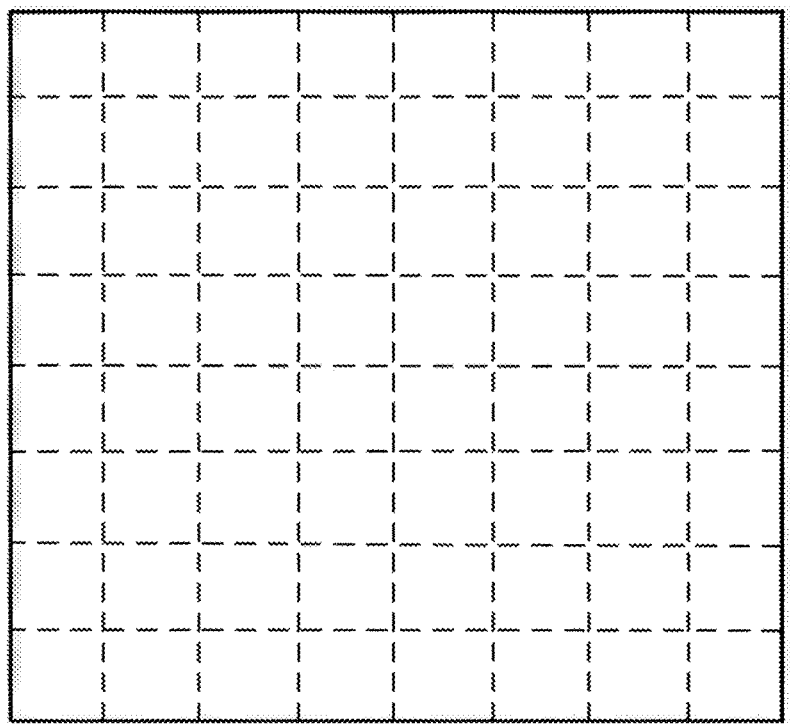
FIG. 3A shows an example uniform sampling of a cube face for CMP.
Figure 3B:
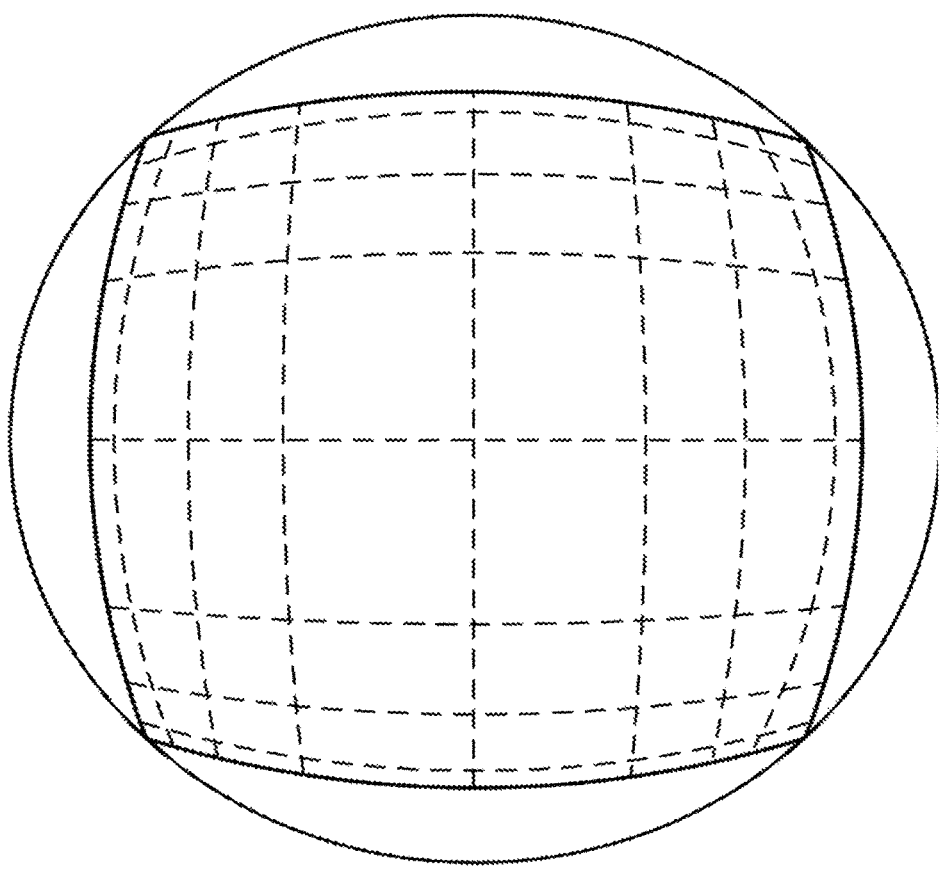
FIG. 3B shows an example non-uniform spherical sampling for CMP.
Figure 3C:
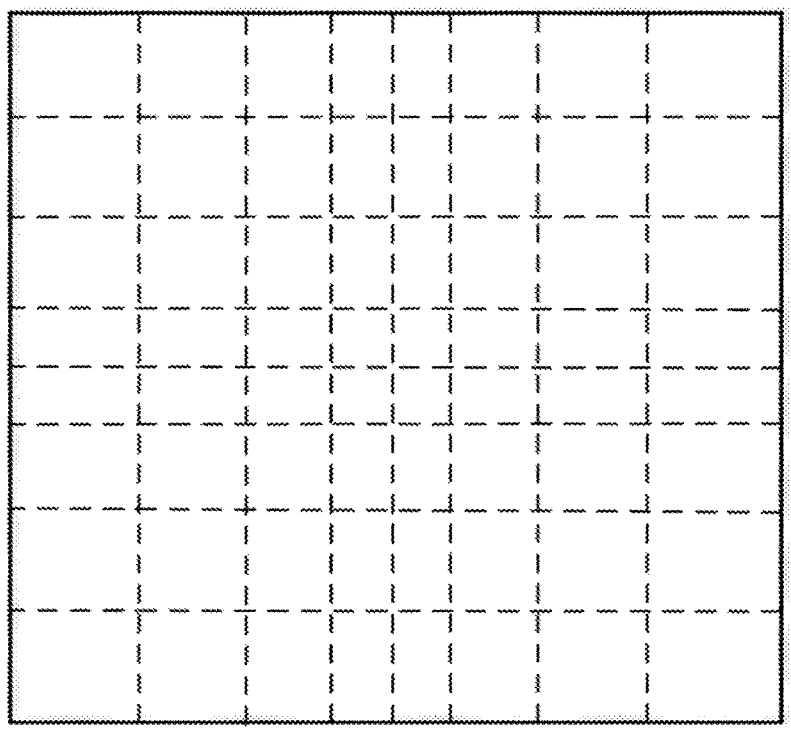
FIG. 3C shows an example non-uniform sampling of a cube face for UNICMP.
Figure 3D:
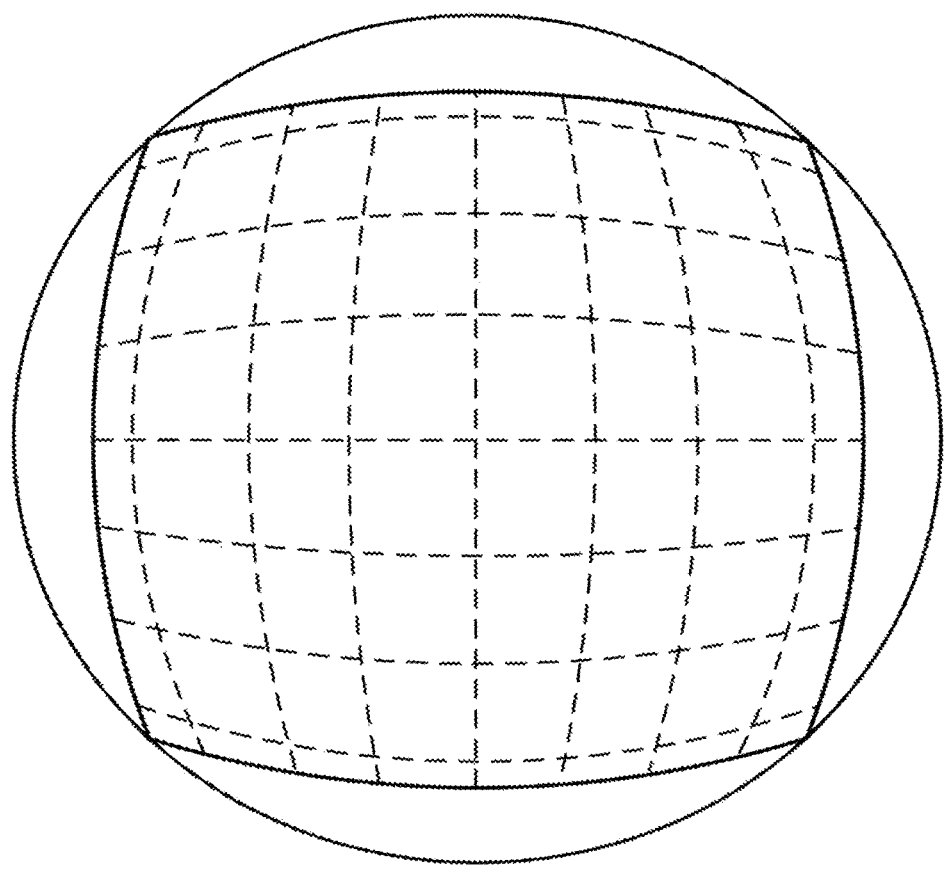
FIG. 3D shows an example uniform spherical sampling for UNICMP.

To resolve the non-uniform sampling problem of the CMP, a unicube map projection (UNICMP) format may be performed. The UNICMP may convert the sampling grid of the CMP into a uniform sampling grid on the sphere. The UNICMP may use a transform function to modify the coordinate of the samples on a 2D planar face before the actual CMP faces are generated. The UNICMP may achieve a better representation of spherical data than the CMP, for example, due to the uniform spherical sampling. The UNICMP may have an enhanced coding efficiency of 360-degree video, in relation to the CMP. FIGS. 3A, 3B, 3C, and 3D show an example comparison of the planar and spherical sampling patterns between CMP and UNICMP. As shown in FIG. 3A, the sampling grid of a CMP face may include one or more (e.g., two) sets of parallel lines. One set of the parallel lines may be in horizontal directions and/or another set of parallel lines may be in vertical directions. A set of parallel partitioning lines may be separated with a uniform interval. As shown in FIG. 3B, when the CMP face is projected onto the sphere, the sampling grid may be distorted where the straight lines in the planar face become curves. Because rectilinear projection may not be a distance-preserving projection, the corresponding sampling grid on the sphere may become non-uniform, as shown in FIG. 3B. To maintain a similar sampling structure as CMP, a face in UNICMP format may be sampled based on one or more (e.g., two) sets of parallel lines. In order to improve the spherical sampling uniformity, the parallel lines in a set may be distributed in a non-uniform way (as shown in an example on FIG. 3C), such that the corresponding sampling grid on the sphere may be uniform (as shown in an example on FIG. 3D).

Figure 5A:
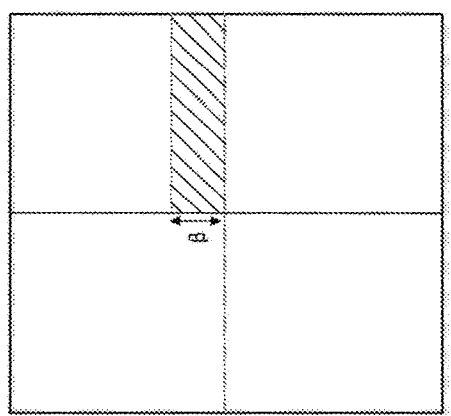
FIG. 5A shows an example non-uniform partition on the cube face.
Figure 5B:
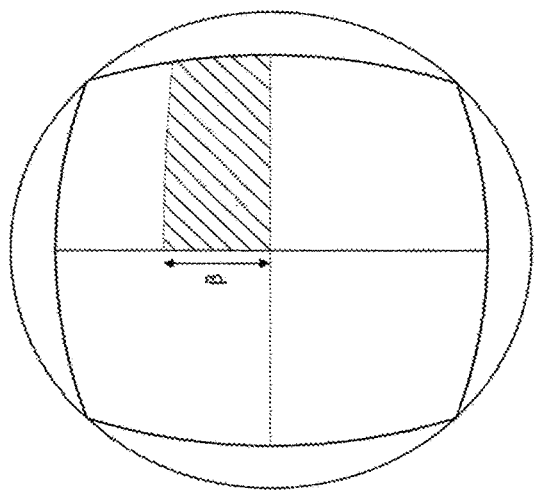
FIG. 5B shows an example corresponding uniform partition on the sphere.
Figure 5C:
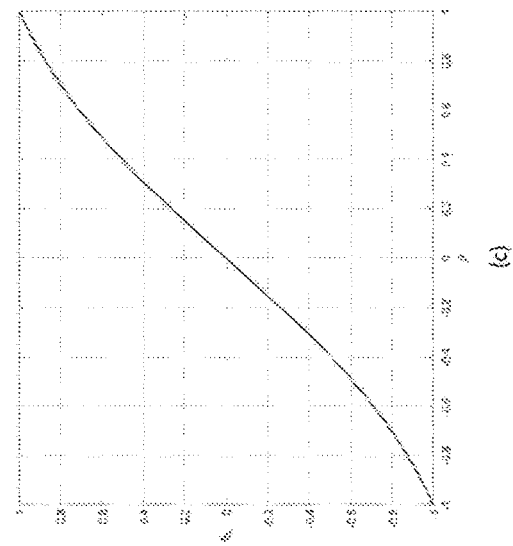
FIG. 5C shows an example transform function between the coordinate of cube face $\beta$ and the coordinate of unicube face $\beta'$.
Figure 6B:
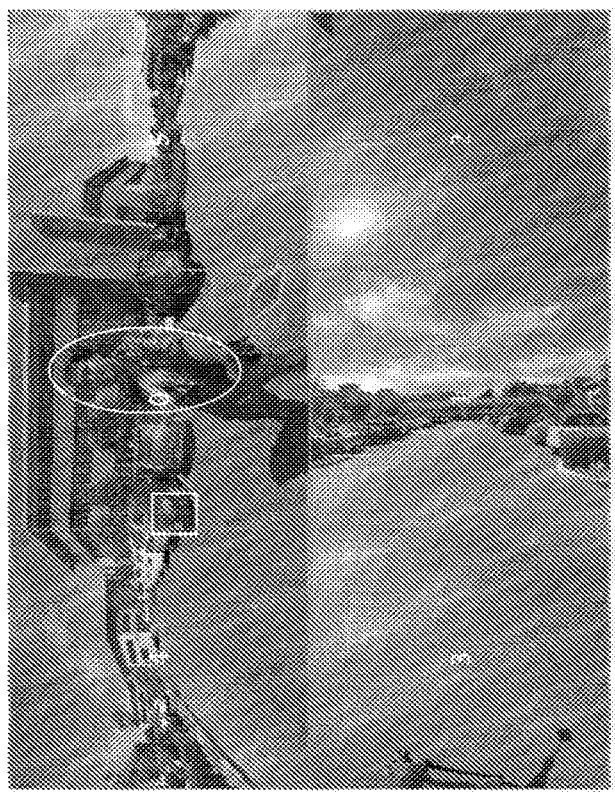
FIG. 6B shows an example projective picture of UNICMP.
Figure 6A:
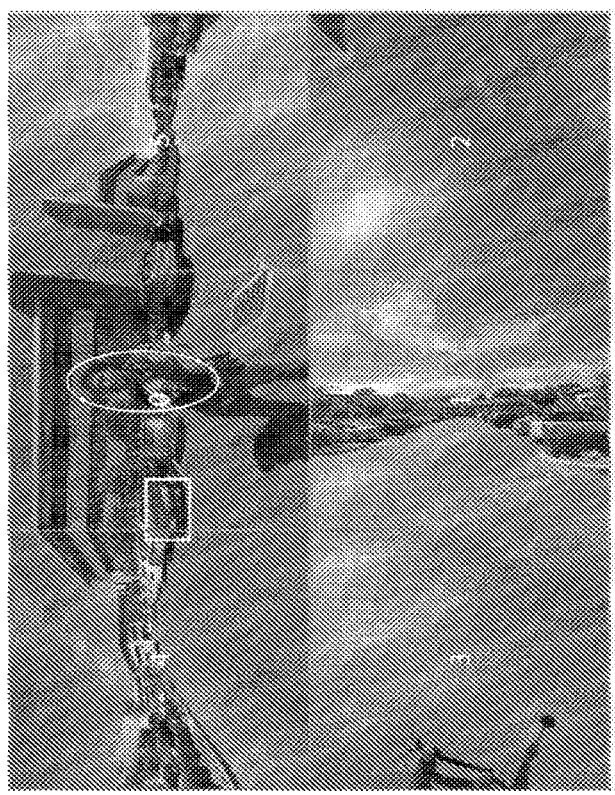
FIG. 6A shows an example projective picture of CMP.

A transform function may be used to transform the non-uniform planar sampling grid into a uniform planar sampling grid. FIGS. 4A, 4B show an example mapping. If the horizontal and vertical transforms are uncorrelated, the mapping from (x, y) to (x', y') may include two separate transforms, e.g., x'=f(x) and y'=f(y), where the same transform function may be applied on x and y independently. It may be possible to compute the inverse transform which maps (x', y') to (x, y), e.g., x=g(x') and y=g(y'). As the two transform functions of x and y may be identical, the derivation of the transform functions of y are discussed herein. Let $\beta \in [-1, 1]$ be the y coordinate of the pattern area on the cube. FIGS. 5A, 5B, and 5C illustrate examples of how to calculate the transform functions between the coordinate of cube face and the coordinate of unicube face. As the transform function $\beta'=f(\beta)$ targets at converting $\beta$ to $\beta'$ with equal rectilinear structure partitioning on the sphere (as shown in FIG. 5B), $f(\beta)$ may be made proportional to the area of the spherical region corresponding to $\beta$. As illustrated in FIG. 5B, the value of $f(\beta)$ may be equal to the ratio between the area of the pattern spherical region and that of the quarter of the sphere corresponding to one cubemap face. The transform function $f(\beta)$ may be calculated as:

$$\beta' = f(\beta) = \frac{6}{\pi}\sin^{-1}\left(\frac{\beta}{\sqrt{2\beta^2 + 2}}\right) \quad (1)$$

where $\beta \in [-1, 1]$. The corresponding inverse transform function $g(\beta')$ (e.g., the mapping from the unicube face to cube face), may be calculated as:

$$\beta = g(\beta') = \frac{\sin\left(\frac{\pi}{6}\beta'\right)}{\sqrt{\frac{1}{2} - \sin^2\left(\frac{\pi}{6}\beta'\right)}} \quad (2)$$

where $\beta' \in [-1, 1]$. FIG. 5C illustrates an example corresponding mapping relationship between $\beta$ and $\beta'$. FIGS. 6A, 6B show two example pictures generated with CMP and UNICMP formats, respectively. As shown in FIGS. 6A, 6B, the UNICMP (e.g., as compared to the CMP) may enlarge the region around the center of a face (e.g., the region enclosed by the ovals) while shrinking the region around the boundaries of a face (e.g., the region enclosed by the squares). Enlarging the region around the center of a face while shrinking the region around the boundaries of a face may resolve the non-uniform spherical sampling of CMP that may have a densely sampling density near face boundaries and/or a sparsely sampling density near face centers, which may result in a better representation of spherical data.

One or more CMP projections or CMP-like projections for 360-degree video coding may be performed (e.g., used, applied, etc.). For example, one or more other CMP-like projection formats may be performed to achieve one or more (e.g., different) spherical sampling features by adjusting the coordinates of the cube face using one or more (e.g., different) transform functions. For example, an adjusted cubemap projection (ACP) may be performed for an improved spherical sampling uniformity by adjusting the coordinates in the cube domain based on the following transform functions:

$$\beta' = f(\beta) = \text{sgn}(\beta) \cdot \left(-0.36 \cdot \beta^2 + 1.36 \cdot |\beta|\right) \quad (3)$$

$$\beta = g(\beta') = \text{sgn}(\beta') \cdot \frac{0.34 - \sqrt{0.34^2 - 0.09 \cdot |x|}}{0.18} \quad (4)$$

where sgn(•) may be the function which returns the sign of the input value. An equi-angular cubemap (EAC) projection may be performed by converting the coordinates between the cube domain and the EAC domain, for example, based on the tangent of the angle of a spherical sample on the cube sampling grid. For example, the transform functions for the EAC projection may be calculated as:

$$\beta' = f(\beta) = \frac{4}{\pi} \tan^{-1}(\beta) \quad (5)$$

$$\beta = g(\beta') = \tan\left(\frac{\pi}{4}\beta'\right) \quad (6)$$

Due to the computational simplicity and/or rectilinear spherical structure, graphic devices may support cube mapping, which may make CMP a widely deployed representation format of 360-degree video. The CMP may unevenly sample the spherical surface (with higher sampling density at face boundaries and lower sampling density at face center), which may result in inefficient representation of spherical data. The UNICMP format may be capable of providing a more uniform sampling grid on the sphere than CMP. As the UNICMP format maintains a face structure similar to that of the CMP format (with further adjusting the coordinates of samples within a face), one or more of the frame-packing schemes and/or hardware implementations applied for the CMP may be reused for the UNICMP.

FIG. 6A shows an example projective picture of CMP.

In CMP-like projection formats (e.g., CMP, UNICMP, ACP and EAC), the same projection geometry may be used for one or more (e.g., all) of the six projection faces. Given that a projection format may have a fixed spherical sampling characteristic, using the same projection geometry for one or more (e.g., all) of the six projection faces may not be optimal to one or more (e.g., all) of the faces. For example, as the sphere sampling density of a CMP face is higher at the face boundaries than that at the face center, it may be beneficial to use the CMP geometry to project the faces which contain more important information (e.g., objects with complex textures) around their boundaries. UNICMP, ACP, and/or EAC may be useful to represent faces which may contain useful spherical information at the region around the face center.

Given the distinctive sampling feature of a projection format, depending on the content within a face, one or more (e.g., different) projection formats may have different coding efficiencies. For example, depending on where objects are located within the face and/or what projection format may be applied to the face, the objects may have one or more (e.g., various) degrees of deformation. Such deformation may lead to a complex motion and/or negatively affect the efficiency of motion-compensated prediction in the video codec, where motion models (such as translation and affine models) may be applied. For example, as shown in FIGS. 6A, 6B, the CMP format may enlarge the region around the boundaries. The CMP may not be an ideal choice to be used on faces that contain content with a complex motion (e.g., large motion from center of the face to the face boundaries, or vice versa). It may be beneficial to allow flexible selection of one or more (e.g., different) projection formats for a cube face according to the specific characteristic of its content contained in the face.

Figure 7:
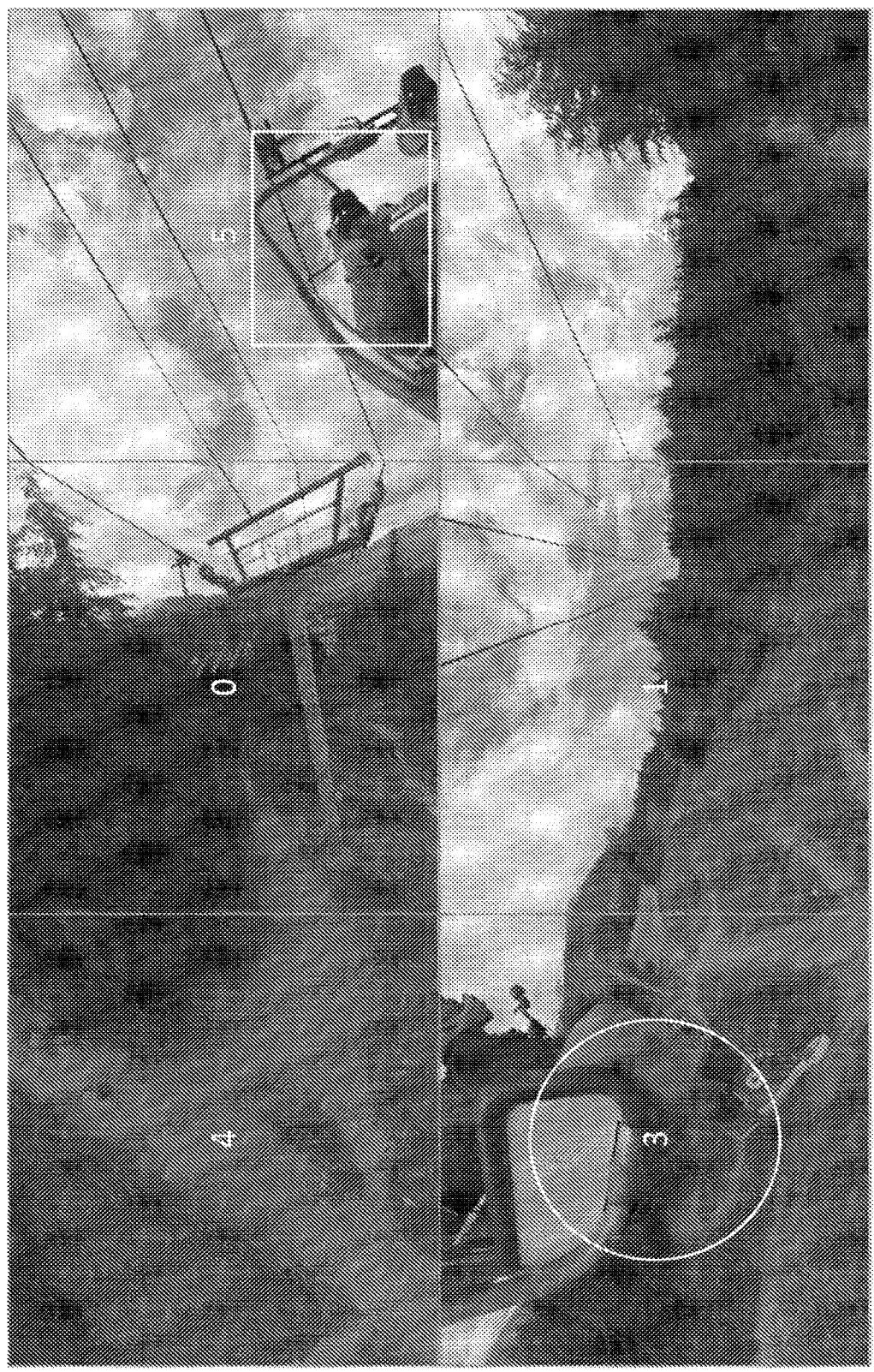
FIG. 7 shows an example CMP picture for Chairlift.

360-degree video may be projected using one or more (e.g., different) projection formats. When 360-degree video is projected using different projection formats, to generate samples in the target projection format the position of the corresponding sample in the source projection format may be calculated. Such calculation may involve a 2D-to-3D mapping and/or a 3D-to-2D mapping. For the 3D-to-2D mapping of the UNICMP (e.g., projecting a 3D spherical sample onto one UNICMP face), the 3D position may be projected into a (e.g., one) 2D coordinate (x, y) defined in the sampling grid of the CMP domain. The 2D coordinate may be mapped into the corresponding coordinate (x', y') in the UNICMP domain by applying the transform function f(•) in x- and y-directions separately. When projecting a 2D coordinate (x', y') on a (e.g., one) UNICMP face to a 3D spherical position (e.g., 2D-to-3D mapping), the 2D coordinate may be mapped to a (e.g., one) intermediate 2D coordinate (x, y) defined in CMP domain based on the inverse transform function g(•), which may be projected onto the 3D space according to rectilinear projection. As shown in Equations (1) and (2), the same transform functions may be used for one or more (e.g., all) the UNICMP faces, for example, to achieve uniform sampling on the sphere. Such transform functions may not maximize the overall coding efficiency of 360-degree video, for example, given that the 3D content projected onto a face may show different characteristics from one another. In such case, different forward/inverse transform functions to different faces may be applied. FIG. 7 shows an example to illustrate the problem where the original 360-degree video Chairlift is rotated by (79, 240, 0) degrees along the (Roll, Pitch, Yaw) directions in the 3D space and/or projected onto the CMP faces. As show in FIG. 7, interesting content (e.g., the most interesting content) in face #5 (as enclosed by the square on face #5) may be located at the bottom boundary of the face and/or the other part of the face may be composed of regions with simple texture. In such a case, it may be preferable to design a transform function which may assign a higher spherical sampling density near the face boundaries and/or a lower spherical sampling density near the face center. For face #3, the region that mostly draws viewers' attention (as enclosed by the circle on face #3) may be located in the center of the face. The coding performance may be improved if a transform function is applied to the face which may assign a lower spherical sampling density at the face boundaries and/or a higher spherical sampling density at the face center.

When deriving the transform functions from (x, y) to (x', y') and/or from (x', y') to (x, y), the same transform function may be performed in x and y directions (e.g., performed in x and y directions separately). Although such method may ensure that the UNICMP faces may have a symmetric partition structure similar to that of the CMP, such symmetry property may not be optimal for one or more (e.g., every) UNICMP faces. The samples in a face may show distinctive sampling property in x and y directions. As shown in FIG. 7, the 3D content in face #1 may show stable characteristics in the horizontal direction (always corresponding to sky region and/or ground region). Along the vertical direction, however, the top portion may correspond to the sky region (with relatively simple texture) and/or the bottom portion may correspond to the ground region (with more texture and directional edges). This may indicate that the content characteristics may change along the vertical direction. Based on the UNICMP design, by always using uniformly sampled points, the optimal sampling efficiency may be not achievable. Non-uniform spherical sampling density in the vertical direction (e.g. gradually increasing the sampling density as we move from the top to the bottom of the face) may be used and/or uniform sampling density in the horizontal direction may be used. A similar problem may exist for the ACP and EAC formats, for example, because these projection formats use transform functions (e.g., the same transform functions) in one or more (e.g., both) directions. It may be beneficial to allow one or more (e.g., different) transform functions to be used in horizontal and vertical directions.

The UNICMP may outperform the CMP in terms of the sampling uniformity on the sphere. The UNICMP may not be optimal when considering the characteristics of the spherical data for a 360-degree video. To achieve better efficiency of representing and/or coding spherical data, the optimal projection format of 360-degree video may allow the projection format (e.g., transform function) to be adjusted for an individual face. To maintain compatibility with the graphic hardware deployed, it may be desirable to exploit the hardware operations and/or modules that may be implemented for existing projection formats in the new projection format. The efficiency of 360-degree video representation and/or the efficiency of 360-degree video coding may be performed.

A hybrid cube projection format (HYBCMP) may allow the adaptive selection of the optimal projection format for a face. For example, a cube face may be coded by an existing CMP-like projection formats (e.g., CMP, UNICMP, ACP and EAC). Different projection formats may present different spherical sampling characteristics. Given that different projection formats may present different spherical sampling characteristics, such flexibility may allow 360-degree video to be coded in a more efficient way.

An enhanced HYBCMP (ENH-HYBCMP) may be performed, for example, to push the coding gain provided by HYBCMP. Compared to the HYBCMP, the ENH-HYBCMP may allow one or more (e.g., different) projection formats for a face and/or may use one or more (e.g., different) transform functions for x- and y-directions in one or more (e.g., multiple) faces to maximally accommodate the spherical sampling density of a face to the characteristics of the corresponding 3D content.

High-level syntax elements may signal geometry information for the HYBCMP and/or the ENH-HYBCMP in the bit-stream. Such information may be used by low-level coding tools for improved coding efficiency and/or by the post-processing to convert the 360-degree video from 2D to 3D for display.

Multiple encoder-side methods may be performed to select the projection format for a face when the HYBCMP is applied, and/or may determine the parameters of the transform function for a face when the ENH-HYBCMP is applied.

Hybrid cube map projection (HYBCMP) may be performed.

A CMP-like projection format (e.g., CMP, UNICMP, ACP and EAC) may have one or more (e.g., different) sampling features on the sphere. For example, for one CMP face, the spherical sampling may be more dense at the face boundaries than at the face center. The UNICMP, ACP, and/or EAC may provide a greater uniformity of the spherical sampling than CMP by moving (e.g., partially moving) spherical samples from face boundaries to face center. FIG. 6B shows an example enlarged region around the face centers and a shrunken region around the face boundaries. Given one or more characteristics of one or more CMP-like projection formats, the HYBCMP format may adaptively select one of the transform functions of CMP, UNICMP, ACP, and/or EAC for the coding of a face. For example, the projection formats may be indexed in the following discussion.

TABLE 1

Projection format definition

| Index | Projection format |
|-------|-------------------|
| 0 | CMP |
| 1 | UNICMP |
| 2 | ACP |
| 3 | EAC |

Based on the definition of the projection format index, the projection formats that may be allowed to be used for 360-degree video coding may be signaled based on the syntax elements in Table 2 at sequence-level, e.g., signaled at video parameter set (VPS), sequence parameter set (SPS).

TABLE 2

Syntax elements for signaling projection formats at sequence level

| | Descriptor |
|---|---|
| projection_format_table( ) { | |
|   num_projection_format | ue(v) |
|   for( i=0; i< num_projection_format; i++ ) { | |
|     project_geometry_idx[i] | ue(v) |
|   } | |
| } | |

Parameters, such as num_projection_format, may specify the total number of the projection formats that may be applied to code the current 360-degree video sequence.

Parameters, project_geometry_idx[i], may specify the projection format index (as defined in Table 1) of the i-th projection format for coding the video sequence.

For example, when CMP and UNICMP formats are allowed (e.g., only CMP and UNICMP formats are allowed) to be used for the sequence, num_projection_format=2, project_geometry_idx[0]=0, and project_geometry_idx[1]=1. When CMP and ACP formats are allowed (e.g., only CMP and ACP formats are allowed) for the sequence, num_projection_format=2, project_geometry_idx[0]=0, and project_geometry_idx[1]=2. A projection geometry table SeqProjectionGeometry may be established by the decoder containing num_projection_format entries, each of which may list the respective allowed projection format. In the first example, SeqProjectionGeometry={0, 1}, and in the second example, SeqProjectionGeometry={0, 2}.

Given the projection format candidates that may be allowed at sequence level, another syntax element set, hybrid_cube_parameter_set( ), may be introduced to indicate which projection format may be used for a projection face in the picture.

TABLE 3

The syntax elements of HYBCMP

| | Descriptor |
|---|---|
| hybrid_cube_parameter_set( ) { | |
|   num_face_rows_minus1 | u(v) |
|   num_face_columns_minus1 | u(v) |
|   for ( i = 0; i <= num_face_rows_minus1; i++ ) { | |
|     for ( j = 0; j <= num_face_columns_minus1; j++ ) { | |
|       face_projection_geometry_idx[i][j] | u(v) |
|     } | |
|   } | |
| } | |

Parameters, such as num_face_rows_minus1 plus one (e.g., num_face_rows_minus1+1), may specify the number of face rows in the frame packed picture.

Parameters, such as num_face_columns_minus1 plus one (e.g., num_face_columns_minus1+1), may specify the number of face columns in the frame packed picture.

Parameters, such as face_projection_geometry_idx[i][j], may specify the index in the array SeqProjectionGeometry for the projection geometry used for the face located at the i-th row and j-th column in the frame packed picture.

The syntax elements described in Table 3 may be signaled at sequence-level and/or picture-level. For example, when it is signaled at sequence level, the selection of the projection formats for a face may be fixed at the sequence-level. The syntax elements may be signaled at a picture level, which may allow the selection of the projection format for one or more (e.g., different) faces to change from picture to picture in the video sequence. When picture level signaling is applied, given that the frame-packing format may not change from picture to picture, the syntax elements num_face_row_minus1 and num_face_columns_minus1 may be skipped for signaling for a picture.

Though not shown in Table 3, another flag may be signaled outside of the i and j loops. This flag may be used to signal whether one or more (e.g., all) faces may use the same face_projection_geometry_idx, and if so, one (e.g., only one) face_projection_geometry_idx may be signaled. The flag may be useful when hybrid_cube_parameter_set( ) is signaled at picture level. Using the flag when hybrid_cube_parameter_set( ) is signaled at picture level may be more efficient for the case when one or more pictures choose to use the same face_projection_geometry_idx for one or more (e.g., all) faces, and/or when other pictures choose to use different face_projection_geometry_idx for different faces.

Enhanced hybrid cube map projection (ENH-HYBCMP) may be performed.

Figure 8:
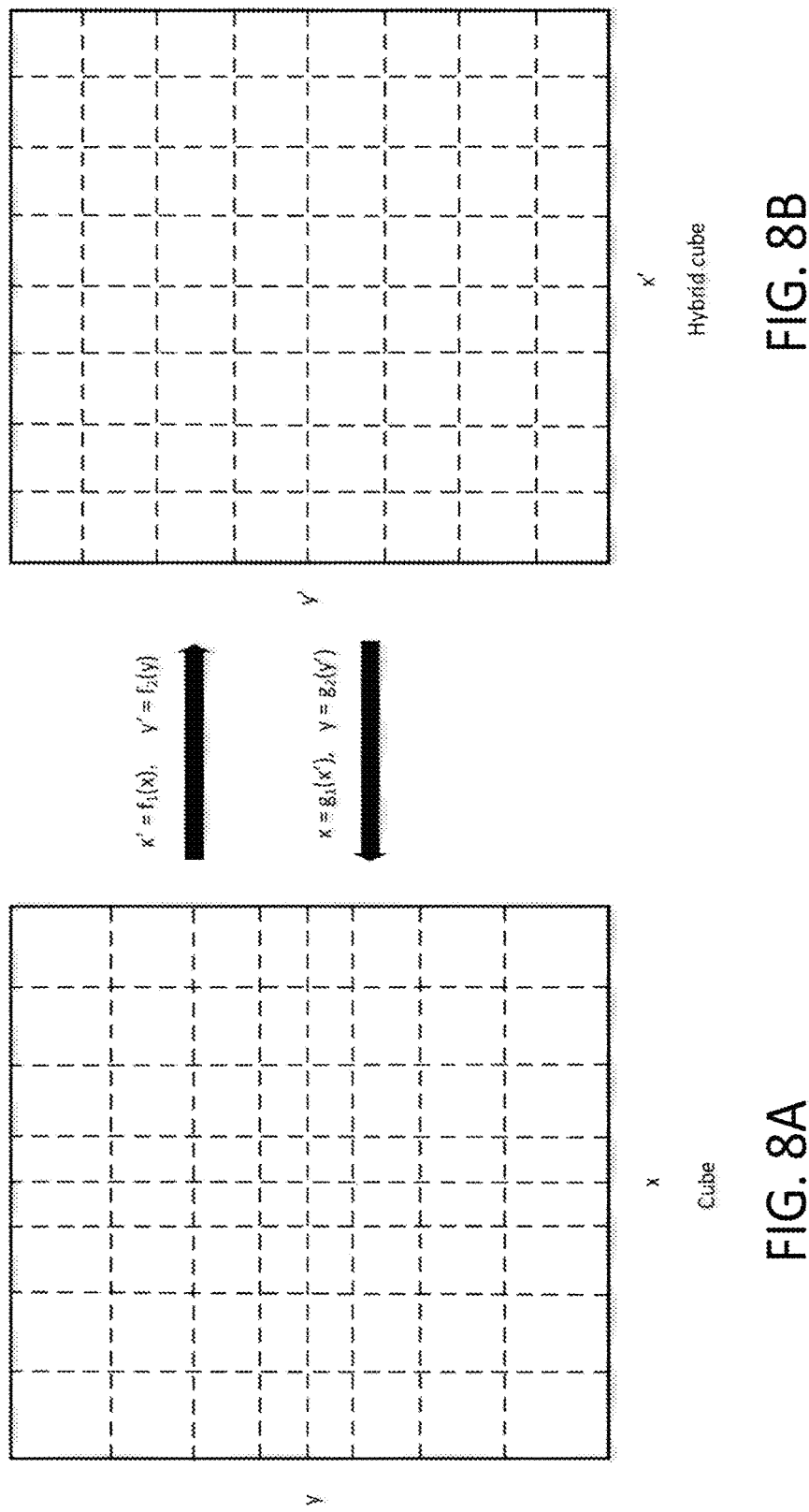
FIG. 8A shows an example mapping of a cube face domain to a hybrid cube face domain.
FIG. 8B shows an example mapping from a hybrid cube face domain to a cube face domain.

In the HYBCMP, a limited number of predefined projection formats may be allowed to be selected as the coding projection format for a cube face. Table 1 contains fixed project formats and/or may not allow a user to specify customized projection formats. To improve the coding performance, the ENH-HYBCMP format may be performed. Similar to the UNICMP, ACP, and EAC, the ENH-HYBCMP may convert the cube mapping into another spherical mapping by using a function to modify the coordinate before actual CMP face is generated. Compared to one or more (e.g., all) of the CMP-like projection formats which may perform the same transform function in x- and y-directions for one or more (e.g., all) of the faces, the transform functions in the ENH-HYBCMP may be customized for a face and/or a direction based upon the video content. The transform functions may be represented using polynomial models. The transform function may be applied for the 2D-to-3D mapping. As shown in FIGS. 8A, 8B, a mapping from (x', y') to (x, y) may transform the partition coordinate from the hybrid cube domain to the cube domain. For example, the mapping may involve two transform functions, e.g., $x=g_1(x')$ and $y=g_2(y')$, which may be approximated by a polynomial model, e.g., $$x = g_1(x') = \sum_{i=0}^{N} a_i \cdot (x')^i = a_N \cdot (x')^N + a_{N-1} \cdot (x')^{N-1} + \ldots + a_1 \cdot x' + a_0 \quad (7)$$

$$y = g_2(y') = \sum_{j=0}^{M} b_j \cdot (y')^j = b_M \cdot (y')^M + b_{M-1} \cdot (y')^{M-1} + \ldots + b_1 \cdot y' + b_0 \quad (8)$$

where $(x', y') \in [-1, 1]$, $a_i$ and $b_j$ may be the polynomial regression coefficients; N and M may be the orders of the polynomial functions which may be assumed to be in Equations (7) and (8). So that the coordinates in the hybrid cube sampling grid may fit the cube sampling grid (e.g., the spherical sampling grid of one or more (e.g., all) hybrid cube faces may cover the sphere, e.g., the whole sphere), the following constraint may be satisfied, for example:

$$g_1(1) = \sum_{i=0}^{N} a_i = a_N + a_{N-1} + \ldots + a_1 + a_0 = 1 \quad (9)$$

$$g_1(-1) = \sum_{i=0}^{N} a_i \cdot (-1)^i = a_N - a_{N-1} + \ldots - a_1 + a_0 = -1 \quad (10)$$

$$g_2(1) = \sum_{j=0}^{M} b_j = b_M + b_{M-1} + \ldots + b_1 + b_0 = 1 \quad (11)$$

$$g_2(-1) = \sum_{j=0}^{M} b_j \cdot (-1)^j = b_M - b_{M-1} + \ldots - b_1 + b_0 = -1 \quad (12)$$

The curve of the transform functions may go (e.g., always go) through the origins of the x- and y-axes, a constraint may be applied as $a_0=b_0=0$. Based on Equations (7) and (8), the transform function may be calculated for the inverse mapping from (x, y) to (x', y') (e.g., transforming the partition coordinates from cube domain to hybrid cube domain) as:

$$x'=f_1(x)=g_1^{-1}(x) \quad (13)$$

$$y'=f_2(y)=g_2^{-1}(y) \quad (14)$$

From Equations (7) and (8) and Equations (13) and (14), the relationship between the coordinate (x', y') may be built in the hybrid cube domain and/or the coordinate (x, y) in cube domain. The geometric relationship may be known for the coordinate in the cube domain and the corresponding 3D point $P_s$ on the sphere. The projection conversion may be achieved for the ENH-HYBCMP format and one or more other projection formats, for example, by using the CMP as the intermediate stage. For example, to map a coordinate in the ENH-HYBCMP format into another projection format, the coordinate may be mapped into an intermediate coordinate (e.g., as defined in the CMP format based on (7) to (8)). The intermediate coordinate may be projected onto the target projection format using the existing 2D-to-3D transform function of the CMP and the 3D-to-2D transform function of the target projection format. Taking ERP as example, given a sample at the coordinate $(x_c', y_c')$ in the ENH-HYBCMP, the mapped coordinate of its correspondence in the ERP may be calculated as follows: For a coordinate conversion from ENH-HYBCMP to CMP, given the input coordinate ($x_c'$, $y_c'$) in the ENH-HYBCMP, the intermediate coordinate ($x_c$, $y_c$) in the CMP may be calculated according to Equations (3) to (4); For 2D-to-3D mapping from CMP to sphere, given the intermediate coordinate ($x_c$, $y_c$), the coordinate of the corresponding 3D point $P_s$ on the sphere may be calculated; For 3D-to-2D mapping from sphere to ERP, given the coordinate of the 3D point $P_s$, the coordinate ($x_e$, $y_e$) of its projection point in the ERP domain may be calculated.

Using the mapping in Equations (13) and (14), the conversion from the ERP to the ENH-HYBCMP may be achieved through the steps (e.g., three steps) described herein, but in reverse. For example, the geometry conversion from the ERP to the HYBCMP may be performed as follows: For 2D-to-3D mapping from ERP to sphere, given an input coordinate ($x_e$, $y_e$) in the ERP, the corresponding 3D point $P_s$ on the sphere may be calculated; For 3D-to-2D mapping from sphere to CMP, given the coordinate of the 3D point $P_s$, the coordinate ($x_c$, $y_c$) of its projection point in the CMP may be calculated; For coordinate conversion from CMP to ENH-HYBCMP, given the coordinate ($x_c$, $y_c$) in the CMP, the output coordinate ($x_c'$, $y_c'$) in the HYBCMP may be calculated according to Equations (13) and (14).

As shown in Equations (7) and (8), the transform functions $x=g_1(x')$ and $y=g_2(y')$ may be approximated by two polynomial functions of order N and M, respectively. Using polynomial functions with one or more (e.g., different) orders may lead to one or more (e.g., different) accuracies of approximating the transform functions. A high-order polynomial model may be more advantageous, for example, because a high-order polynomial model may represent the true transform function more precisely. Choosing a high-order polynomial model may lead to increased conversion complexity, for example, because there may be more multiplications and/or additions used in the coordinate conversion. Signaling overhead of higher order polynomial model may be higher. Higher signaling overhead may be less problematic than higher computation complexity. The optimal polynomial order may be selected. The optimal polynomial order may be large enough to ensure a sufficient conversion precision and/or not increase (e.g., overwhelmingly increasing) the conversion complexity (and signaling overhead). The same polynomial order may be used for the faces (e.g., all six faces) of the HYBCMP format and/or in the x- and y-directions. One or more (e.g., different) polynomial orders may be applied (e.g., adaptively applied) for an HYBCMP face, for example, based on the specific characteristic of the face. The orders of the polynomial functions that may be applied in x- and/or y-directions in a face may be different. To facilitate explaining how to apply the HYBCMP format to 360-degree video coding, a second-order polynomial model may be used. To simplify the transform function, the symmetry constraint (as shown by the transform function in FIG. 5C) may be applied such that the transform functions may be symmetric with respect to the origin of the x- and/or y-axes. The transform functions from (x', y') to (x, y) as given by Equations (7) and (8) may be simplified as:

$$x = g_1(x') = \text{sgn}(x') \cdot (a_2 \cdot x'^2 + a_1 \cdot |x'|) \quad (15)$$

$$y = g_2(y') = \text{sgn}(y') \cdot (b_2 \cdot y'^2 + b_1 \cdot |y'|) \quad (16)$$

where sgn(•) may be the function which may return the sign of the input. The inverse transform function may be computed (as shown in Equations (13) and (14)) as:

$$x' = f_1(x) = \text{sgn}(x) \cdot \frac{-a_1 + \sqrt{a_1^2 + 4a_2 \cdot |x|}}{2a_2} \quad (17)$$

$$y' = f_2(y) = \text{sgn}(y) \cdot \frac{-b_1 + \sqrt{b_1^2 + 4b_2 \cdot |y|}}{2b_2} \quad (18)$$

Figure 9:
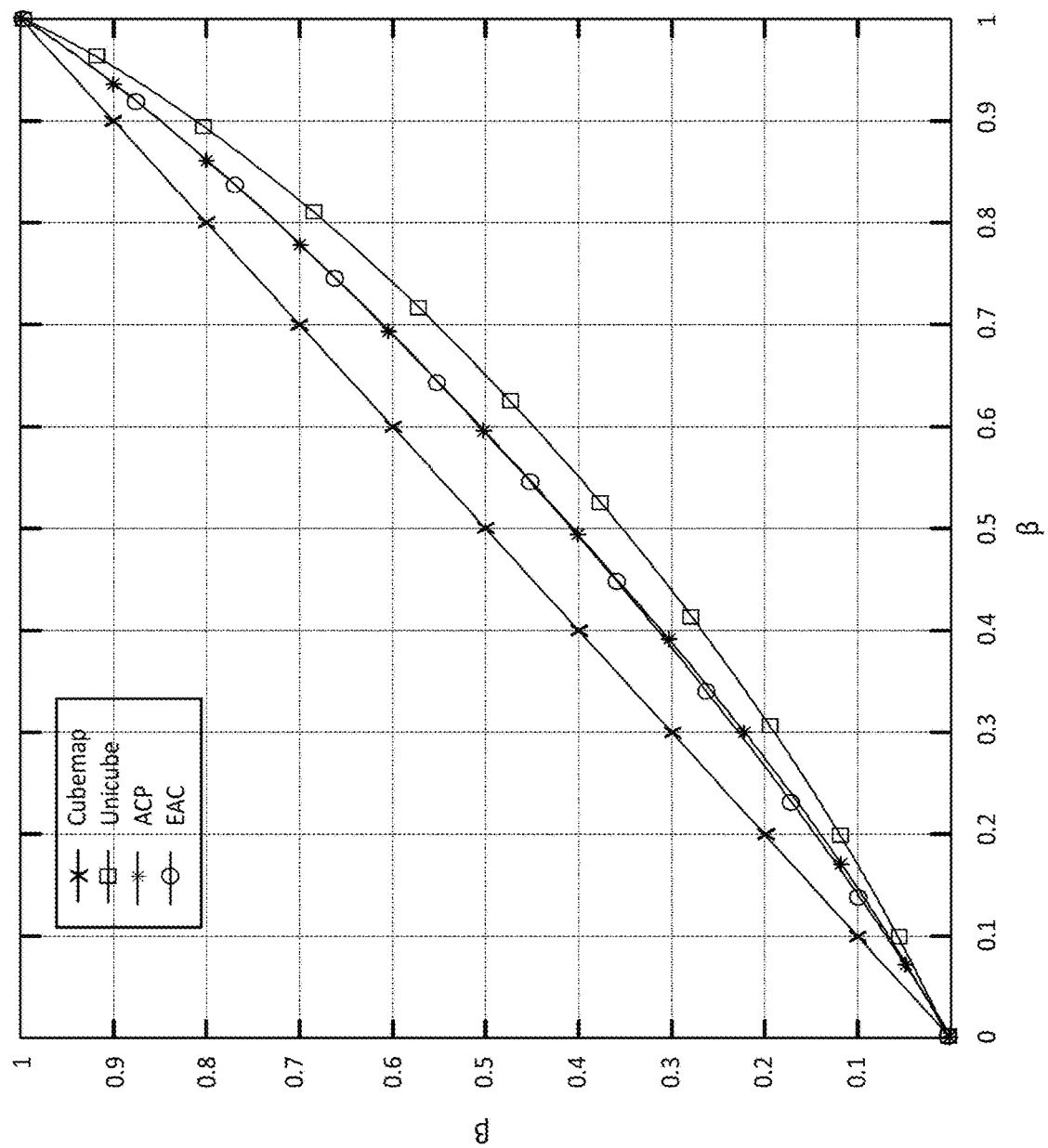
FIG. 9 shows an example comparison of the transform function from the partition grid of CMP, UNICMP, ACP and EAC.

Based on equations (15) to (18), a variety of transform functions for the HYBCMP and the CMP may be acquired by adjusting the values of $a_1$, $a_2$, $b_1$ and/or $b_2$. Configurations of the parameters may imply the transform functions of some existing projection formats, e.g., the setting of $a_1=b_1=1$ and $a_2=b_2=0$ may correspond to the mapping function of the CMP, and/or the setting of $a_1=b_1=0.555$ and $a_2=b_2=0.445$ may approximate the transform function of the UNICMP. FIG. 9 shows examples of one or more (e.g., different) HYBCMP transform functions which may be generated to approximate existing projection formats, for example, by changing the values of the parameters $a_1$ and $a_2$ in Equations (11) and (12). In FIG. 9, the curves of the transform functions may be plotted for one or more (e.g., different) settings. The first case may correspond to the CMP ($a_1=1$ and $a_2=0$). The second case may correspond to the UNICMP ($a_1=0.555$ and $a_2=0.445$). The third case may correspond to the transform function with the setting of $a_1=0.662$ and/or $a_2=0.326$, which may approximate the transform function of the ACP. The fourth case may correspond to the transform function when setting $a_1=0.689$ and/or $a_2=0.311$, which may approximate the transform function of the EAC.

FIG. 9 shows an example that the transform functions of CMP, UNICMP, and/or EAC show distinctive spherical sampling features, for example, depending on the positions within a face while the transform function of the ACP may be close to that of EAC at the regions around the boundaries and/or the center of a face. For example, the spherical sampling density of the CMP may be the highest at the face boundary while the spherical sampling density of the CMP may become the lowest at the face center. The spherical sampling density of the UNICMP may be higher than that of the CMP and/or the EAC at the face centers. However, the spherical sampling density of the UNICMP may be lower than that of the CMP and/or the EAC at the face boundaries.

Figure 10C:
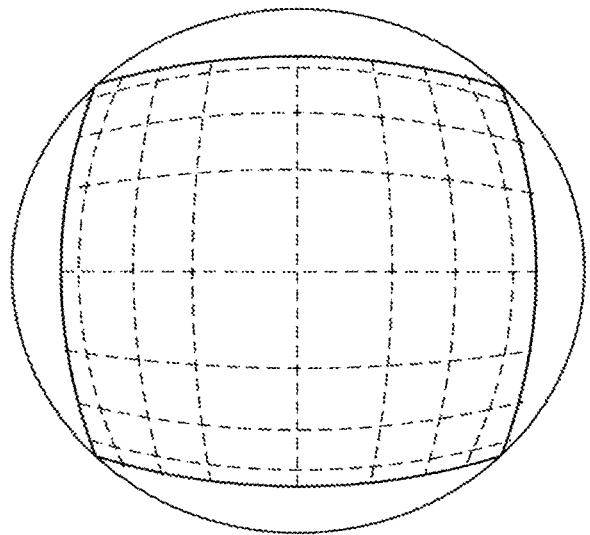
FIG. 10C shows an example comparison of the spherical sampling grid of an EAC.
Figure 10B:
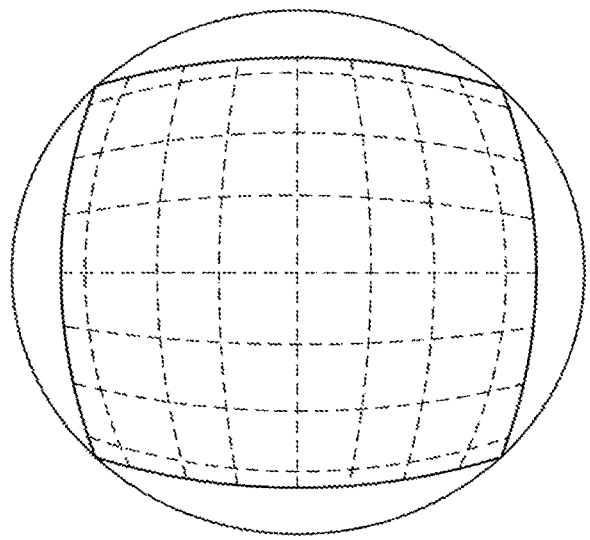
FIG. 10B shows an example comparison of the spherical sampling grid of a UNICMP.
Figure 10A:
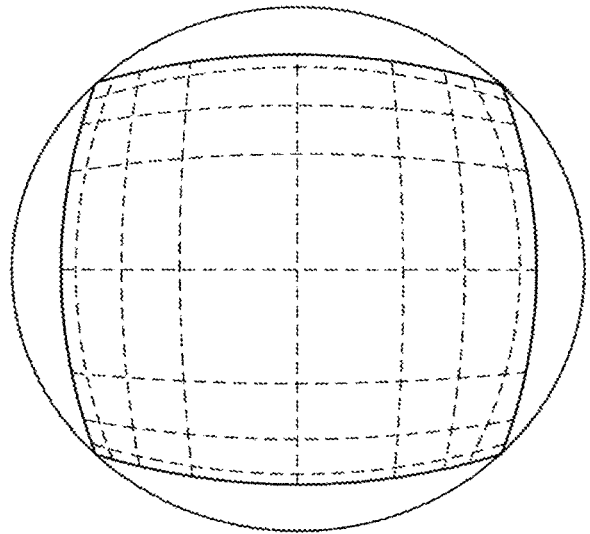
FIG. 10A shows an example comparison of the spherical sampling grid of a CMP.

FIGS. 10A, 10B, 10C show examples that compare the corresponding spherical sampling grids of the CMP, the UNICMP, and/or the EAC. The ACP's sampling grid may be similar to the EAC. By adjusting the parameters, the ENH-HYBCMP format may allow one or more (e.g., different) transform functions to be used in x- and y-directions for a face. Compared to CMP and UNICMP, which may apply the same transform function in x- and y-directions for one or more (e.g., all) faces, such flexibility may provide efficiency of coding 360-degree video, for example, by adapting (e.g., maximally adapting) the spherical sampling feature of a face to the characteristics of the corresponding content on the sphere. As shown in FIG. 7, if HYBCMP is applied, the transform function of the UNICMP may be applied to face #3 which may contain the most interesting content (as enclosed by the circle) at the center of the face, and the transform function of CMP may be applied to face #5 where the regions with complex textures (as enclosed by the square) may be located at the face boundaries.

The polynomial mode may be used to derive the transform functions x=g₁(x') and/or y=g₂(y'), e.g., the transform function that may transform the coordinate from the hybrid cube domain to the cube domain. The corresponding inverse transform functions x'=f₁(x) and y'=f₂(y) may be used, e.g., the transform functions that may transform the coordinate from the cube domain to the hybrid cube domain may be calculated as the inverse functions of $g_1(x)$ and $g_2(y)$. The transform functions may be applied in an opposite way. For example, the polynomial mode may derive the transform functions x'=f₁(x) and/or y'=f₂(y). The corresponding inverse mapping x=g₁(x') and y=g₂(y') may be derived as the inverse functions of $f_1(x')$ and $f_2(y')$. The polynomial model may be used to model the transform functions for the ENH-HYBCMP and/or the CMP. Other model functions (e.g., exponential function, logarithmic function, etc.) may be applied to the ENH-HYBCMP format.

The transform functions $f_1(x)$ and/or $f_2(x)$ may be used for mapping the coordinate from CMP to ENH-HYBCMP. The transform functions $f_1(x)$ and/or $f_2(x)$ may be represented as second order polynomial equations as:

$$x'=f_1(x)=\text{sgn}(x)\cdot(a_2\cdot x^2+a_1\cdot |x|) \tag{19}$$

$$y'=f_2(y)=\text{sgn}(y)\cdot(b_2\cdot y^2+b_1\cdot |y|) \tag{20}$$

The inverse functions of the transform functions $f_1(x)$ and $f_2(x)$ may be $g_1(x')$ and $g_2(y')$. $g_1(x')$ and $g_2(y')$ may be used for mapping the coordinate from ENH-HYBCMP to CMP and may be represented as:

$$x=g_1(x')=\text{sgn}(x')\cdot\frac{-a_1+\sqrt{a_1^2+4a_2\cdot|x'|}}{2a_2} \tag{21}$$

$$y=g_2(y')=\text{sgn}(y')\cdot\frac{-b_1+\sqrt{b_1^2+4b_2\cdot|y'|}}{2b_2} \tag{22}$$

Figure 11:
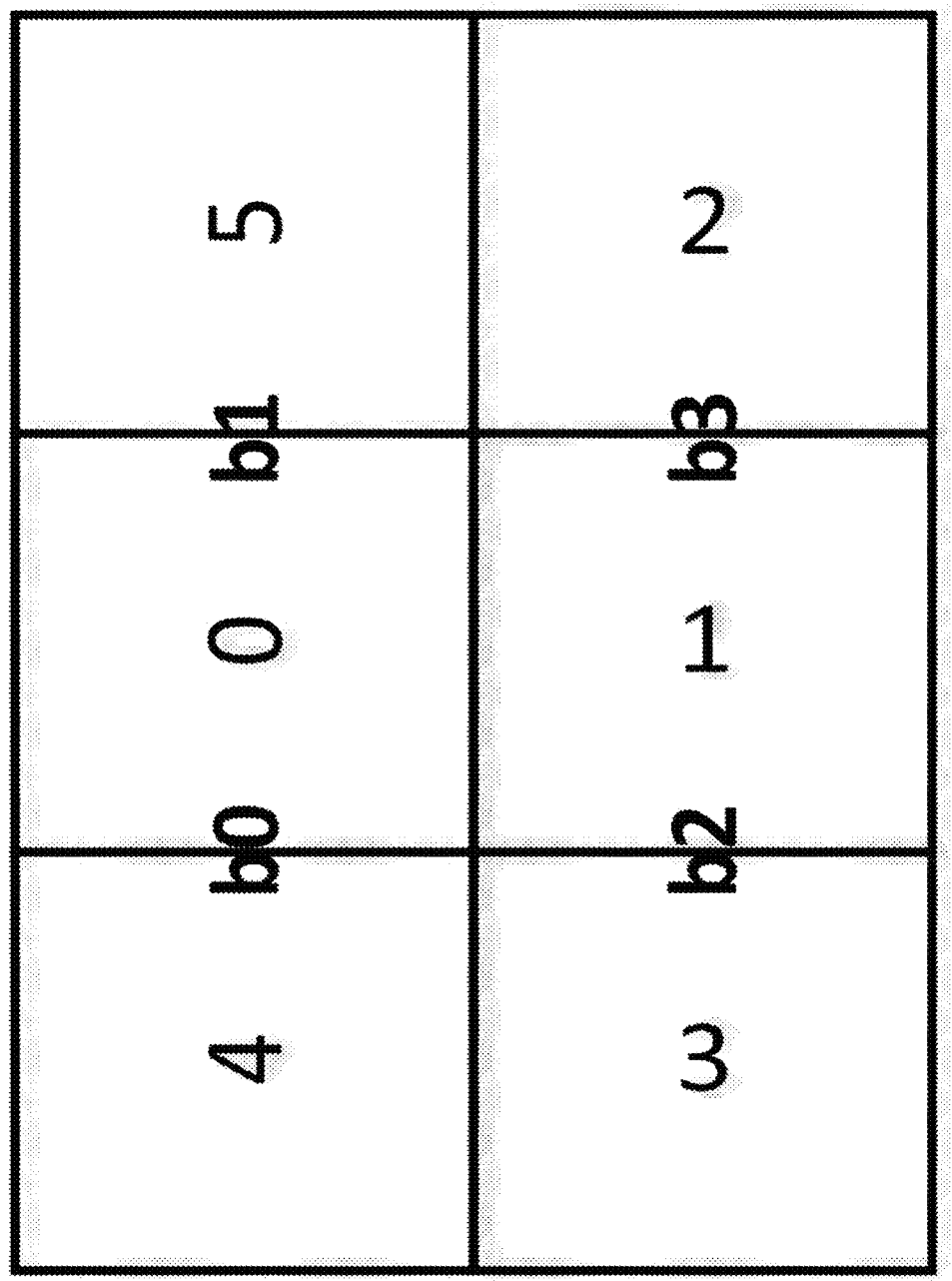
FIG. 11 shows an example 3×2 frame packing.

Mappings may be provided for horizontal and/or vertical directions defined for one or more faces in the ENH-HYBCMP. For example, there may be mappings for horizontal and/or vertical directions defined for one or more faces in the ENH-HYBCMP, such as those provided in Equations (15) and (16). The ENH-HYBCMP may be frame packed as a 3×2 layout, as shown in FIG. 11. If the ENH-HYBCMP is frame packed as a 3×2 layout, Face 0 may be connected with Face 4 and/or Face 5 in 3D space. Content may be continuous across boundary b0. Content may be continuous across boundary b1. If the vertical mapping of Face 4 is different than the vertical mapping of Face 0, the sampled content across one or more (e.g., two) sides of boundary b0 may be misaligned in a vertical direction. For example, if there is a horizontal line across the boundary b0, the line may be broken at the boundary b0. The vertical mapping of Face 0 may be different than the vertical mapping of Face 5. If the vertical mapping of Face 0 is different than the vertical mapping of Face 5, the sampled content across the sides (e.g., two sides) of boundary b1 may be misaligned. The boundary b2 and/or b3 in a 3×2 layout may have a continuity characteristic that may be the same, or substantially the same, as the continuity characteristic of b0 and/or b1. The misalignment issues that may apply to b0 and/or b1 may apply to the boundaries b2 and/or b3.

Figure 12A:
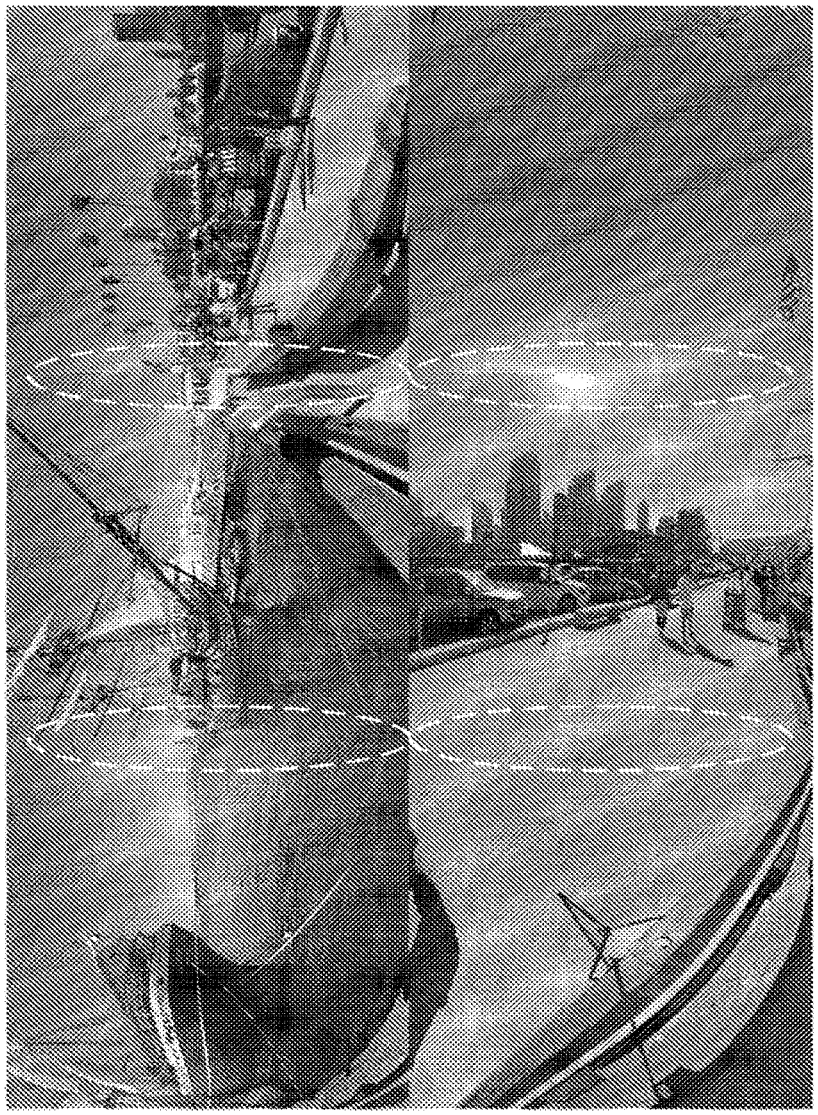
FIG. 12A shows an example HCP with 3×2 frame packing without a face boundary continuity constraint.
Figure 12B:
FIG. 12B shows an example HCP with 3×2 frame packing with a face boundary continuity constraint.

FIG. 12A shows an example in which the vertical mapping of Face 0 may be different than the vertical mapping of Face 4 and/or Face 5, and the vertical mapping of Face 1 may be different than the vertical mapping of Face 2 and/or Face 3. The face boundaries in the dashed ellipse may be boundaries connecting neighboring faces (e.g., two 3D neighboring faces). A misalignment at b0, b1, b2, b3 may occur. Discontinuity at the face boundary may cause a coding loss for intra prediction and/or inter prediction. For example, the reference samples may be different than the current block if the current block is located at the face boundary. For inter prediction, the prediction unit may be split. For example, the prediction unit may be split to keep prediction units (e.g., all prediction units) located within a face if the prediction unit is across the face boundary. The neighboring faces at boundaries b0, b1, b2, b3 may be aligned in FIG. 11. For example, the neighboring faces at boundaries b0, b1, b2, b3 may be aligned in FIG. 11 if the continuity constraint is applied. The constraint to keep the continuity at boundaries b0, b1, b2, b3 may be used for the frame packing based encoding in the ENH-HYBCMP. Neighboring faces in frame packing layout may be connected in 3D space. For example, if neighboring faces (e.g., two neighboring faces) in a frame packing layout are connected in 3D space, the neighboring faces may share a vertical mapping to retain continuity. For the mapping in the horizontal direction of one or more faces, constraints may not exist. One or more faces may have a set of parameters for horizontal and/or vertical mappings. For example, 12 sets of mapping parameters may be signaled for the faces (e.g., all 6 faces), and constraints may not exist. A constraint may be applied in a vertical direction. If the constraint is applied in a vertical direction for a 3×2 frame packing layout (e.g., as shown in FIG. 11), Face 4, Face 0 and/or Face 5 may share a vertical mapping, and/or Face 3, Face 1 and Face 2 may share a vertical mapping. Sets (e.g., 8 sets) of mapping parameters (e.g., 6 for horizontal mapping and 2 for vertical mapping) may be signaled. For example, 8 sets of mapping parameters may be provided.

Figure 13A:
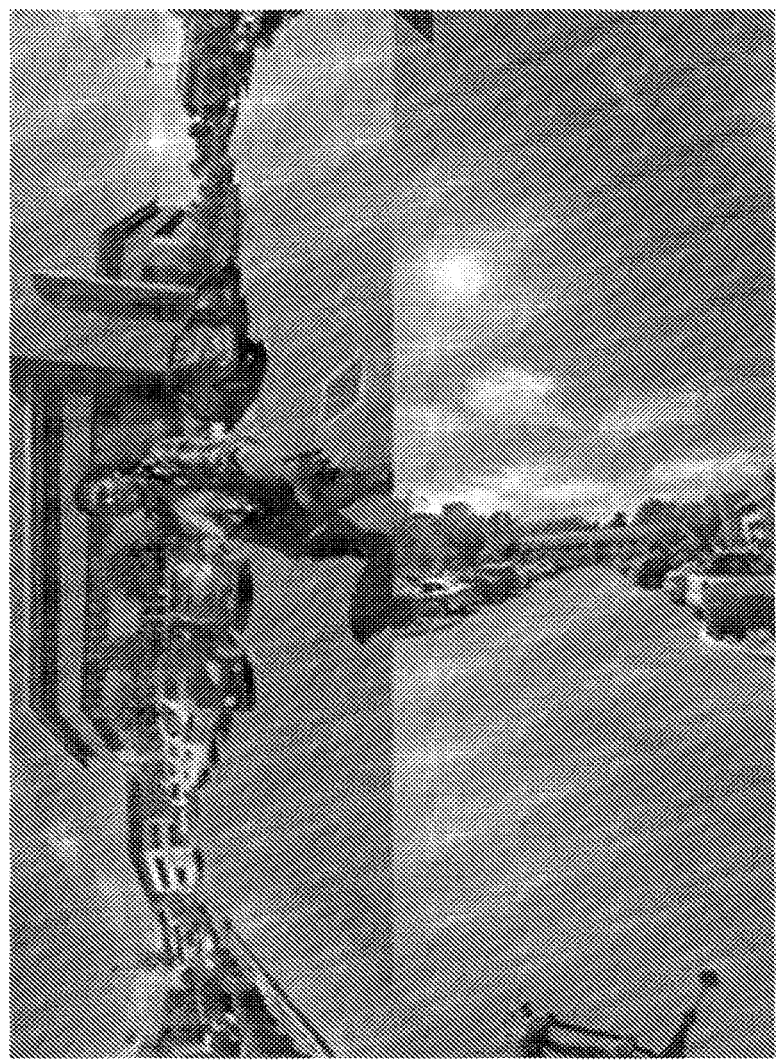
FIG. 13A shows an example video captured by a moving camera picture at POC 0.
Figure 13B:
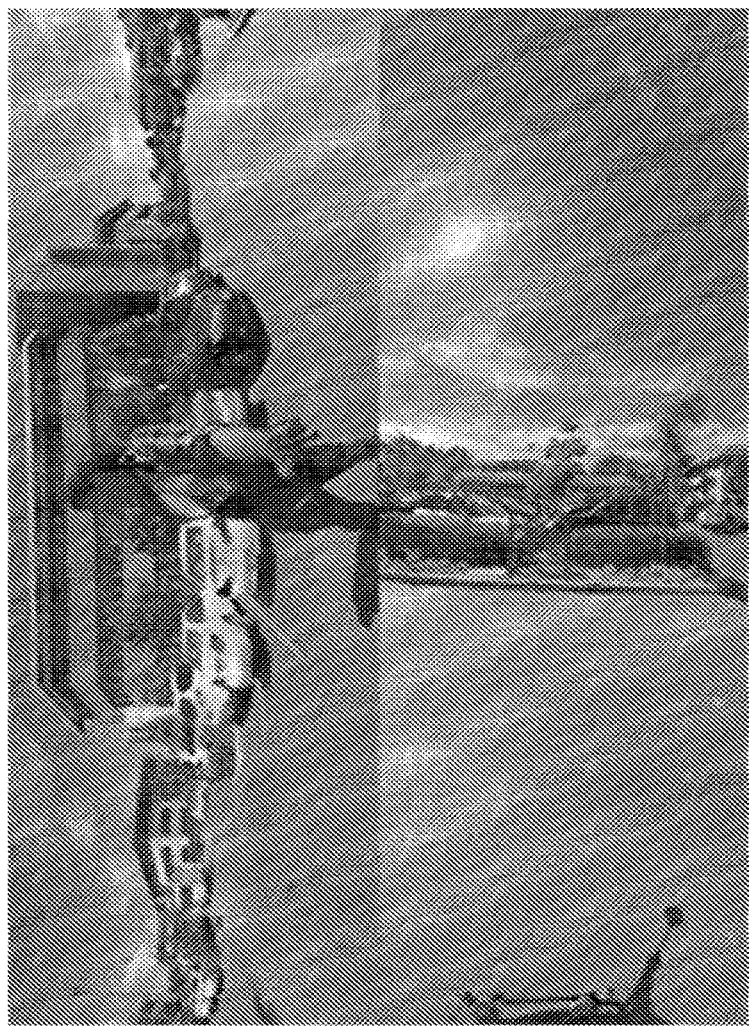
FIG. 13B shows an example video captured by a moving camera picture at POC 32.

A mapping may be derived for the sampling. For example, a mapping may be optimized for the sampling according to characteristics of content. For example, if the area contains variations (e.g., edges and/or textures), the sampling density may be increased (e.g., higher). If the area is a smooth area, the sampling density may be decreased (e.g., lower). For video captured by a moving camera, the content (e.g., content within a face) may change (e.g., may change frequently). FIGS. 13A, 13B show an example video captured by a camera (e.g., fast moving camera) at two times. The appearance of one or more faces may change. For example, the appearance of one or more faces may change when the time difference is minimal (e.g., one second). The optimized mapping may be updated (e.g., updated periodically). The mapping function may be updated from picture P. The inter prediction of pictures using picture P as inter reference picture and/or having different mappings with picture P may be affected. For example, the inter prediction of pictures using picture P as inter reference picture and/or having different mappings with picture P may be affected because the appearance of the same or substantially similar object in the pictures may be different than the appearance in picture P. The appearance of the same or substantially similar object in the pictures may be different than the appearance in picture P due to different mappings being used for the pictures. Having the same or substantially similar object in the pictures be different than the appearance in picture P may reduce the temporal correlation. A conversion may be applied to align the mapping used in a reference picture to the current picture. The conversion may be applied such that the reference picture mapping may be aligned with the current picture and/or the current picture mapping may be aligned with the reference picture.

The conversion between one or more mappings for ENH-HYBCMP may be determined based on the relationship between mappings for ENH-HYBCMP. For example, if the first set of mapping is defined as Equations (15), (16), (17), (18) and the second set of mapping may be defined as:

$$x = g'_1(x') \quad (23)$$

$$y = g'_2(y') \quad (24)$$

$$x' = f'_1(x) \quad (25)$$

$$y' = f'_2(y) \quad (26)$$

The projection format may be referred with the second set of mapping of ENH-HYBCMP, defined by Equations (23), (24), (25), (26) as ENH-HYBCMP-2. The projection format may be referred with the first set of mapping of ENH-HYBCMP, defined by Equations (15), (16), (17), (18) as ENH-HYBCMP-1. Given the position (x2', y2') in ENH-HYBCMP-2, the projected position (x1', y1') in ENH-HYBCMP-1 may be calculated with the mapping. For example, the projected position (x1', y1') in ENH-HYBCMP-1 may be calculated without converting (x2', y2') from 2D position in ENH-HYBCMP-2 to 3D coordinates and/or projecting 3D coordinates to 2D projected position in ENH-HYBCMP-1.

$$x1' = f_1(x) = f_1(g'_1(x2')) \quad (27)$$

$$y1' = f_2(y) = f_2(g'_2(y2')) \quad (28)$$

$f_1(g'_1())$ and $f_2(g'_2())$ may be implemented by a lookup table given the mapping defined by Equations (15), (16), (17), (18), and (23), (24), (25), (26).

High-level syntax design for signaling the information of the ENH-HYBCMP may be performed.

As show in FIG. 1, the decompressed 360-degree video may be converted to the display geometry which may be used for dynamically rendering viewports according to a user's viewing angle. When the ENH-HYBCMP format is applied as the coding projection format in 360-degree video system, the information of the transform functions may be transmitted to the decoder to apply processing to the 360-degree video for display (on HMD or other display devices). Such information may be used by low-level coding tools for improving the efficiency of 360-degree video coding. For example, a geometry padding may improve motion-compensated prediction for 360-degree video by padding the reference samples with the consideration of the 3D geometry structure represented in the coding projection format. High-level syntax elements may signal the necessary geometry information of the ENH-HYBCMP format in the bit-stream. The second-order polynomial model (as shown in Equations (15) to (18) may illustrate the high-level syntax signaling. The syntax may be applicable to one or more other models, and/or the same polynomial model but with different orders.

As shown in Equations (7) and (8), the polynomial coefficients may be real values, and may be quantized before transmission. The quantization of the polynomial coefficients in the x-direction may be extended to the coefficients of the transform function in the y-direction. The real-value coefficient $a_i$, where i=1, 2, may be uniformly quantized using a quantization step size $q_{step}$ and/or may be approximated by an integer value (denoted as $a_i^{Int}$), as described as:

$$a_i = a_i^{Int} \cdot q_{step} \quad (29)$$

Given that the quantization step $q_{step}$ may be a real value, it can be further approximated by a multiplication of one integer factor M followed by a right shift of N-bit, e.g., $$a_i = a_i^{Int} \cdot q_{step} = (a_i^{Int} \cdot M) >> N \quad (30)$$

To transmit the polynomial coefficients $a_i$'s, the quantized coefficients $a_i^{Int}$'s, together with the factors M and N, may be specified in bit-stream. Appropriate quantization step sizes may be used when the ENH-HYBCMP is applied for 360-degree video coding. Because appropriate quantization step sizes may be used when the ENH-HYBCMP is applied for 360-degree video coding, the error resulting from the coefficient quantization may produce a non-negligible impact on the precision of the transform functions. One or more (e.g., different) quantization step sizes (e.g., different M and N) may be applied for x- and y-direction and/or different faces. The values of M and N may be signed for a direction and/or a face. The same quantization step size (e.g., the same M and N) may be applied for x- and/or y-directions in one or more (e.g., all) the faces and signal the values of M and N to decoder. Fixed values of M and N may be used (e.g., always used) at encoder and/or decoder. In such case, the values of M and/or N in bit-stream may not be signaled.

A syntax element set, hybrid_cube_parameter_set( ), may indicate the transform coefficients in bit-stream for the ENH-HYBCMP format, for example, to deliver the coefficients of the transform functions from encoder to decoder. Assuming that the second-order polynomial model may be applied and/or the identical quantization step size (the same M and N) may be used for x- and/or y-directions in one or more (e.g., all) the faces, Table 4 illustrates an example structure of the syntax elements for signaling the mapping coefficients for the HYBCMP format.

TABLE 4

The proposed syntax elements of signaling the coefficients of the transform functions for the ENH-HYBCMP

| | Descriptor |
|---|---|
| hybrid_cube_parameter_set( ) { | |
|   num_face_rows_minus1 | u(v) |
|   num_face_columns_minus1 | u(v) |
|   IdenticalTransFuncsForAllFaces = false | |
|   for(i=0; i<=num_face_rows_minus1 && !IdenticalTransFuncsForAllFaces; i++ ) { | |
|     for (j=0; j<=num_face_columns_minus1 && !IdenticalTransFuncsForAllFaces; j++ ) { | |
|       if(i==0 && j== 0) { | |
|         use_identical_trans_funcs_for_all_faces | |
|         IdenticalTransFuncsForAllFaces = use_identical_trans_funcs_for_all_faces | |
|       } | |
|       horizontal_trans_func_type | u(v) |
|       trans_func_type_same_flag | u(1) |
|       if(!trans_func_type_same_flag) | |

TABLE 4-continued

The proposed syntax elements of signaling the coefficients
of the transform functions for the ENH-HYBCMP

| | Descriptor |
|---|---|
|     vertical_trans_func_type | u(v) |
|     if( horizontal_trans_func_type == user_defined ) { | |
|       UserDefinedCoeffSent = true | |
|       for ( k = 0; k < 2; k++ ) { | |
|         horizontal_trans_coeff_abs[i][j][k] | u(v) |
|         horizontal_trans_coeff_sign[i][j][k] | u(v) |
|       } | |
|     } | |
|     if(vertical_trans_func_type == user_defined) { | |
|       UserDefinedCoeffSent = true | |
|       for ( k = 0; k < 2; k++ ) { | |
|         vertical_trans_coeff_abs[i][j][k] | u(v) |
|         vertical_trans_coeff_sign[i][j][k] | u(v) |
|       } | |
|     } | |
|   } | |
| } | |
| if (UserDefinedCoeffSent) { | |
|   coeff_scaling_factor_minus1 | u(v) |
|   coeff_bit_shift | u(v) |
| } | |
| } | |

Parameters, such as num_face_rows_minus1 plus one (e.g., num_face_rows_minus1+1), may specify the number of face rows in the frame packed picture.

Parameters, such as num_face_columns_minus1 plus one (e.g., num_face_columns_minus1+1), may specify the number of face columns in the frame packed picture.

Parameters, such as use_identical_trans_funcs_for_all_faces, may indicate whether the same transform functions are used for all the faces in the frame packed picture. For example, when use_identical_trans_funcs_for_all_faces flag is equal to 1, the transform functions for the face located at the first row and/or the first column in the frame-packed picture may be reused as the transform functions of the other faces. When use_identical_trans_funcs_for_all_faces flag is equal to 0, the faces in the frame-packed picture may use different transform functions.

Parameters, such as UserDefinedCoeffSent, may specify whether a user-defined format is being used.

Parameters, such as horizontal_trans_func_type, may specify the type of the transform function in horizontal direction. The type of mapping function is defined in Table 5.

Parameters, such as trans_func_type_same_flag equal to 1, may specify that the same transform function type in horizontal direction may be used for vertical direction.

Parameters, such as vertical_trans_func_type, may specify the type of the transform function in vertical direction. The type of transform function is defined in Table 5.

TABLE 5 transform function type definition

| trans_func_type index | Descriptor |
|---|---|
| 0 | CMP |
| 1 | UNICMP |
| 2 | ACP |
| 3 | EAC |
| 4 | user_defined |

Parameters, such as horizontal_trans_coeff_abs[i][j][k], may specify the absolute value of the k-th coefficient for the horizontal transform function of the face located at the i-th row and j-th column in the frame packed picture.

Parameters, such as horizontal_trans_coeff_sign[i][j][k], may specify the sign of the k-th coefficient for the horizontal transform function of the face located at the i-th row and j-th column in the frame packed picture.

Parameters, such as horizontal_transform_coeff_abs[i][j][k] and/or horizontal_transform_coeff_sign[i][j][k], may specify the value of the k-th coefficient for the horizontal transform function of the face located at the i-th row and j-th column in the frame packed picture as:

HorTransCoeff[$i$][$j$][$k$]=((1−2*horizontal_trans_coeff_sign[$i$][$j$][$k$])*horizontal_trans_coeff_abs[$i$][$j$][$k$]*(coeff_scaling_factor_minus1+1))>>coeff_bit_shift Parameters, such as vertical_trans_coeff_abs[i][j][k], may specify the absolute value of the k-th coefficient for the vertical transform function of the face located at the i-th row and j-th column in the frame packed picture.

Parameters, such as vertical_trans_coeff_sign[i][j][k], may specify the sign of the k-th coefficient for the vertical transform function of the face located at the i-th row and j-th column in the frame packed picture.

Parameters, such as vertical_trans_coeff_abs[i][j][k] and/or vertical_trans_coeff_sign[i][j][k], may specify the value of the k-th coefficient for the vertical transform function of the face located at the i-th row and j-th column in the frame packed picture as:

VerTransCoeff[$i$][$j$][$k$]=((1−2*vertical_trans_coeff_sign[$i$][$j$][$k$])*vertical_trans_coef_abs[$i$][$j$][$k$]*(coeff_scaling_factor_minus1+1))>>coeff_bit_shift Parameters, such as coeff_scaling_factor_minus1 plus one (e.g., coeff_scaling_factor_minus1+1), may specify the value of scaling factor used to calculate the coefficients of the transform function.

Parameters, such as coeff_bit_shift, may specify the number of right shifts used to calculate the coefficients of the transform function.

When the ENH-HYBCMP is used for coding 360-degree video, the syntax elements as described in Table 4 may be signaled at sequence-level and/or picture-level. For example, the hybrid_cube_parameter_set( ) may be signaled at sequence-level parameter set, such as VPS and SPS. The selection of the transform functions may (e.g., may only) be allowed at the sequence-level, such that the same set of transform functions may be used for one or more (e.g., all) the pictures in the same video sequence. The hybrid_cube_parameter_set( ) may be signaled at picture-level parameter set, such as PPS or slice header. This may allow the adaptation of the transform function at picture-level in the sense that a picture may have the freedom to select its own transform function.

Face based signaling is described herein. A region based method may be performed. For example, a face can be partitioned into multiple rectangular regions. The region may be equal or un-equal. For a region, the transform functions may be signaled. The transform function for two neighboring regions may have equal value at region boundary. The face (e.g., entire face) may be sampled without any overlapping.

As shown in Table 4, the transform functions (in horizontal and/or vertical directions) of a face may be signaled without prediction. For example, when the parameter set hybrid_cube_parameter_set( ) is signaled more frequently, e.g., picture-based signaling and/or region-based signaling. Given the strong temporal correlation of the pictures in the same video sequence, the transform functions of a face may be similar to that of the collocated face in its temporal neighboring pictures. A prediction method may be applied for coding the transform functions of one face, for example, to reduce the signaling overhead. When the transform functions of a face may be signaled (e.g., horizontal_trans_func_type and/or vertical_trans_func_type may be equal to user_defined), a flag trans_coeff_pred_enable_flag may be signaled. When trans_coeff_pred_enable_flag is equal to zero, the parameters of the transform functions in the face may be independently coded, for example, without prediction. trans_coeff_pred_enable_flag is equal to one may indicate that the parameters of the transform functions in the face may be predicted from the transform function parameters of the same face in the temporal reference picture that precedes the current picture in the decoding order. When the temporal scalability is enabled, a picture may not be predicted from another reference picture which may be located at higher temporal layers compared to the temporal layer of the picture. When the prediction method is enabled, the transform function parameters of the faces in the current picture may be predicted from the preceding picture with equal or less temporal layer index. The reference picture that directly precedes the current picture may be used to predict the transform function parameters in the current picture. A candidate list of transform function parameters of the temporal reference pictures may be maintained at encoder and/or decoder for predicting the transform functions of the current picture. To select the transform function predictor, a variable trans_coeff_predictor_idx may be signaled to indicate the transform functions of which reference picture may be used to predict the transform functions of the current picture.

If the face boundary continuity constraint, described herein, is applied for ENH-HYBCMP, the number of bits may be reduced for coefficient signaling. The coefficients of mapping may be shared among faces with one or more constraints. For example, the coefficients for the vertical mapping may be shared for faces in the top face row. The coefficients for the vertical mapping may be shared for faces in the bottom face row in the frame packing layout. An indication may be signaled to indicate whether the constraint is applied. For example, one or more flags may be signaled to indicate whether the constraint is applied if the projection format is ENH-HYBCMP. When the constraint is applied, (num_face_rows_minus1+1)×(num_face_columns_minus1+1) horizontal mapping coefficients may be signaled, and/or (num_face_rows_minus1+1) vertical mapping coefficients may be signaled.

A constraint may be applied to the sign of one or more (e.g., all) second order coefficients (horizontal_trans_coeff_sign[i][j][2] and vertical_trans_coeff_sign[i][j][2]). For example, if signaled coefficients are for Equation (15) and/or (16) and/or the second order coefficients are (e.g., are all) non-negative under the constraint (e.g., which may mean that horizontal_trans_coeff_sign[i][j][2] and/or vertical_trans_coeff_sign[i][j][2] may be equal to zero), the sign values for the second order coefficients may be excluded from signaling when the sign constraint applies. If signaled coefficients are for Equation (19) and/or (20) and the second order coefficients are (e.g., are all) non-positive under the constraint (e.g., which may mean horizontal_trans_coeff_sign[i][j][2] and vertical_trans_coeff_sign[i][j][2] may be equal to one), the sign values for the second order coefficients may be excluded from signaling when the sign constraint applies.

Derivation of the parameters for the HYBCMP and ENH-HYBCMP projection formats may be performed.

For the HYBCMP, one or more (e.g., different) projection formats may be allowed to be used for one or more (e.g., different) faces. For the ENH-HYBCMP format, one or more (e.g., different) transform functions (e.g., $g_1(x')$ and $g_2(y')$ in Equations (7) and (8)) may be allowed to be used for projecting 360-degree video onto one or more (e.g., different) faces. Encoder-side methods may be performed for determining the optimal parameters. Coding statistics may be considered when determining the parameters of the transform functions for the HYBCMP format.

The conversion loss may be incurred by one or more (e.g., different) transform functions. An efficiency (e.g., a better representation efficiency) of 360-degree video may be achieved. For example, a better representation efficiency of 360-degree video may be achieved by assigning one or more (e.g., different) projection formats (as in HYBCMP) and/or one or more (e.g., different) transform functions (as in ENH-HYBCMP) to one or more faces according to the characteristics of the corresponding 3D content on the sphere. The impact on the quality of the reconstructed 360-degree video may evaluated after projection format conversion (e.g., no compression) when one or more (e.g., different) transform functions are used for a face.

The regularity of the motion field resulting from one or more (e.g., different) transform functions may be performed. When 360-degree video is projected to 2D plane, the projected picture in a face may look similar to conventional 2D video. A continuous structure in the 3D space may not be continuous when it is projected onto 2D plane, for example, due to the rectilinear projection. For example, a straight line crossing one or more (e.g., two) neighboring faces may become one or more (e.g., two) line segments in one or more (e.g., different) directions at the boundary of the faces. The motion across the face boundary may become discontinuous. Because the transform functions may not be shape-preserving transforms, it may reduce the regularity of the resulting motion field of the projected picture. The two factors may lead to efficiency loss on motion vector prediction and/or merge mode.

Multiple encoder-side methods may compute the parameters for a face when the HYBCMP and/or the ENH-HYBCMP are applied for 360-degree video coding.

The parameters for a HYBCMP/ENH-HYBCMP face may be determined by minimizing the conversion loss, for example, due to the transform function that may be used to represent 360-degree video on the face. For example, the ground truth 360-degree video in the native projection format (e.g., ERP) may be converted to the HYBCMP/ENH-HYBCMP format using a set of parameters, which may be converted back to the native projection format for quality metric calculation. The set of the optimal parameters may be derived by minimizing the distortion for the original 360-degree video and the reconstructed 360-degree video, as indicated as:

$$\operatorname{argmin} \sum_{i=0}^{5} D_M^i(S_{org}^i, S_{rec}^i) \quad (31)$$

where $S_{org}^i$ and $S_{rec}^i$ may indicate the original signal and the reconstructed signal of the 360-degree video within the i-th face; $D_M^i$ may be the distortion measurement for which one or more (e.g., different) metrics may be applied, such as, WS-PSNR, spherical PSNR (SPSNR), etc. The optimization may be done face by face by ignoring the impact among faces.

A constraint may be used in a mapping parameter derivation. For example, if the projection format is ENH_HYBCMP and the face boundary continuity constraint is applied, a constraint may be used in a mapping parameter derivation. The frame packing may be a 3×2 layout, as shown in FIG. 11. The parameter search for the 3×2 frame packing scheme may be separated into one or more steps when the face boundary continuity constraint is used. The first step may search parameters for the top face row (e.g., Face 0, Face 4, and/or Face 5). The second step may search parameters for the bottom face row (e.g., Face 1, Face 2, and/or Face 3).

For one or more face rows, the following parameter searching for horizontal (first direction) and/or vertical (second direction) mappings may be used. In the first step, parameters for the first direction may be searched and/or parameters for the second direction may be fixed. The parameters for the first direction may be updated with parameters (e.g., optimal parameters) found in searching. If there is no update, searching may stop. If there is an update, the second step may be used. In the second step, parameters for the second direction may be searched and/or parameters for the first direction may be fixed. The parameters for the second direction may be updated with parameters (e.g., optimal parameters) found in searching. If there is no update, searching may stop. If there is an update, the first step may be used.

Figure 14:
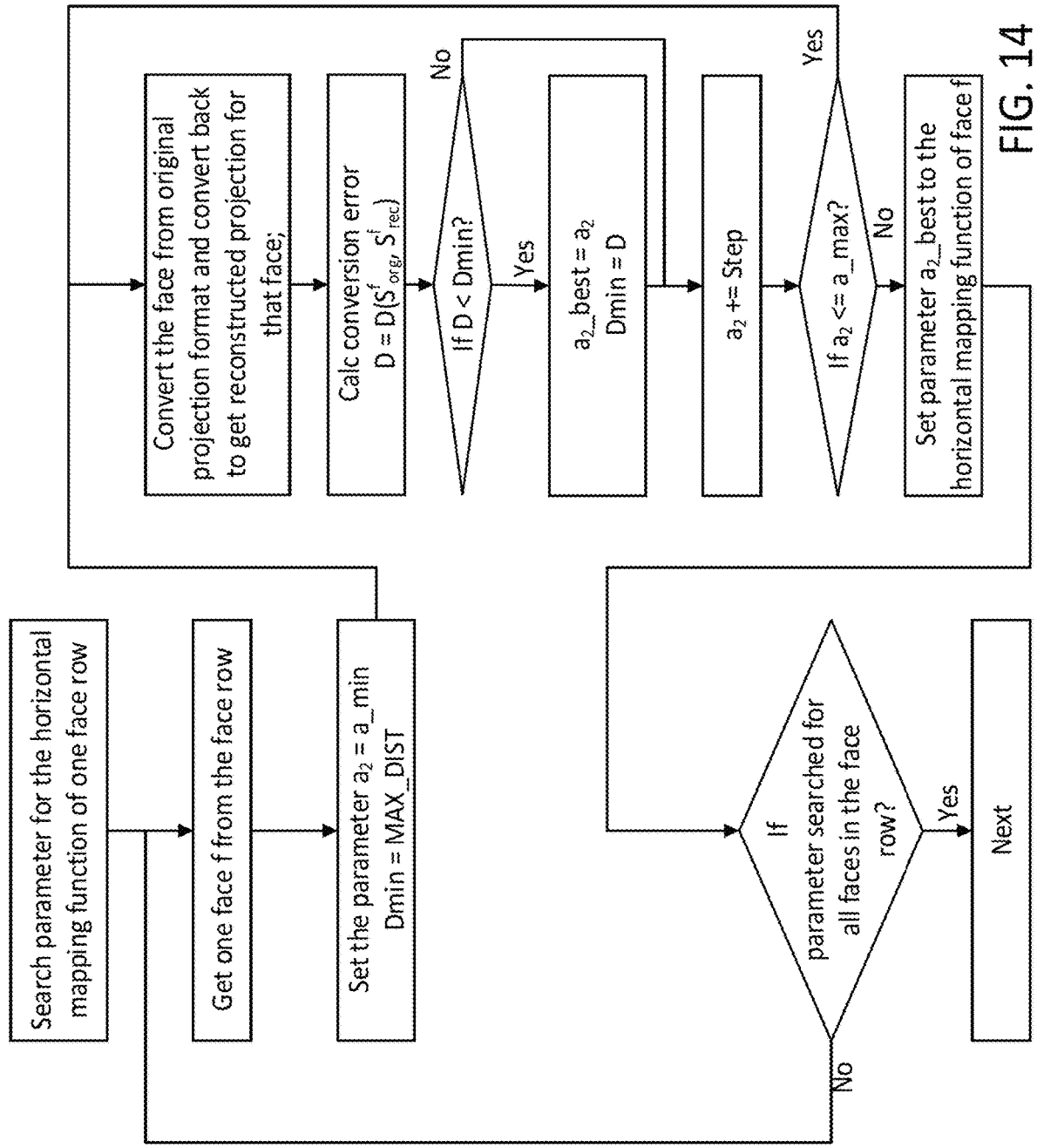
FIG. 14 shows an example horizontal mapping parameter ($a_2$) search given the vertical mapping in a face row.

FIG. 14 shows an example horizontal mapping parameter (e.g., $a_2$) search. For example, FIG. 14 shows an example horizontal mapping parameter (e.g., $a_2$) search given a vertical mapping in a face row. A parameter (e.g., parameter $a_2$) may be searched for a horizontal mapping (e.g., mapping function) of a face row. A face, such as face f, may be received (e.g., retrieved) from the face row. Parameter $a_2$ may be set to a_min, and/or parameter Dmin may be set to MAX_DIST. MAX_DIST may be the maximum distortion. The search range may be [a_min, a_max], Step may be the search step size.

The face may be converted from an original projection format. The face may be converted (e.g., converted back) to the original projection, for example, to get a reconstructed projection for the face. The conversion error may be determined. For example, D may be set to $D(S_{org}^f, S_{rec}^f)$.

If D is less than Dmin, $a_2$_best may be set to $a_2$ and/or Dmin may be set to D. $a_2$ may be set to $a_2$+Step. If $a_2$ is less than or equal to a_max, the face may be converted from the original projection format and converted back, and proceed as provided herein.

Parameter $a_2$_best may be set to the horizontal mapping (e.g., mapping function) of the face (e.g., face f). It may be determined if the parameter was searched for one or more (e.g., all) faces in the face row. If the parameter was searched for one or more (e.g., all) faces in the face row, move to the next part. If the parameter was not searched for one or more (e.g., all) faces in the face row, a face (e.g., face f) may be received (e.g., retrieved) from the face row, and proceed as provided herein.

Figure 15:
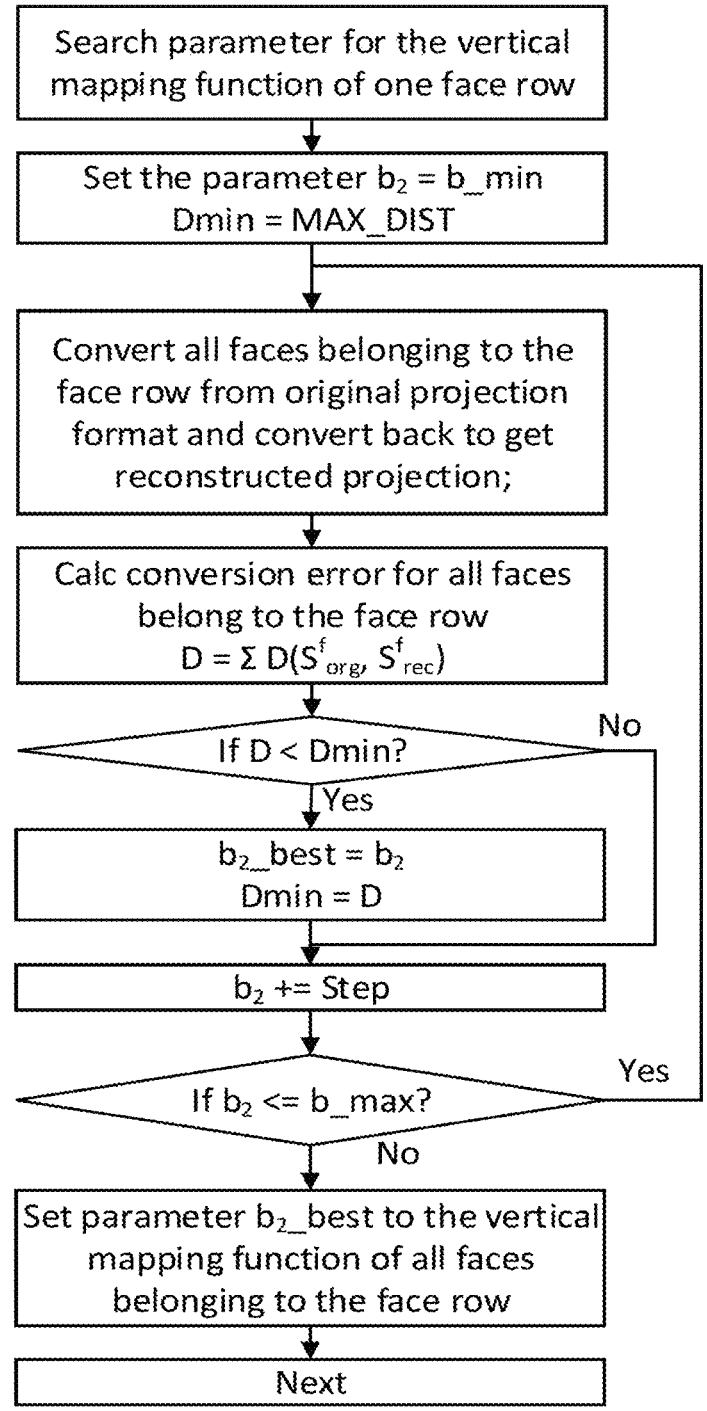
FIG. 15 shows an example vertical mapping parameter ($b_2$) search given the horizontal mapping in a face row.

FIG. 15 shows an example search. For example, FIG. 15 shows an example vertical mapping parameter (e.g., $b_2$) search given a horizontal mapping in a face row. A parameter may be searched for the vertical mapping (e.g. mapping function) of a face row. Parameter $b_2$ may be set to b_min and/or Dmin may be set to MAX_DIST. MAX_DIST may be the maximum distortion. The search range may be [b_min, b_max]. Step may be the search step size.

One or more (e.g., all) faces belonging to a face row may be converted from the original projection format and may be converted (e.g., converted back) to get the reconstructed projection. A conversion error may be calculated for one or more (e.g., all) faces, for example, that belong to the face row. For example, D may be set to $\Sigma D(S_{org}^f, S_{rec}^f)$.

If D is less than Dmin, $b_2$_best may be set equal to $b_2$ and/or Dmin may be set to D. $b_2$ may be set to $b_2$+Step.

If $b_2$ is greater than b_max, parameter $b_2$_best may be set to the vertical mapping (e.g. mapping function) of one or more (e.g., all) faces belonging to the face row, and/or move to the next part. If $b_2$ is less than or equal to b_max, return to converting one or more (e.g., all) faces belonging to the face row from the original projection format, and proceed as provided herein.

Searching may be different for mappings in two or more (e.g., two) directions. For example, searching may be different for mappings in two or more (e.g., two) directions because the constraint may be applied to the mapping of a vertical direction. For the parameter search of the horizontal mappings of faces (e.g., three faces), the parameter of horizontal mapping may be searched (e.g., searched separately) for one or more faces. The parameter of horizontal mapping may be searched (e.g., searched separately) for one or more faces because there may not be a constraint on the horizontal mappings (e.g., the three horizontal mappings). The distortion to be minimized may be the conversion error of one or more faces. For the parameter search of the vertical mapping, the parameter search may consider the three faces as a part, and/or the distortion (e.g., the distortion to be minimized) may be the sum of conversion error of the three faces. For example, if the horizontal mapping of a face is a second order polynomial and/or $g_1(0)$ is equal to 0 and $g_1(1)$ is equal to 1 (as shown in FIG. 9), the horizontal mapping may be defined by Equation (32). The parameter $a_2$ in the face belonging to a face row may be searched, as shown in FIG. 14. If the vertical mapping of a face is a second order polynomial and/or $g_2(0)$ is equal to 0 and $g_2(1)$ is equal to 1 (as shown in FIG. 9), the vertical mapping is defined as Equation (33). The parameter $b_2$ in one or more (e.g., all) faces belonging to a face row may be searched, as shown in FIG. 15.

$$x=g_1(x')=\text{sgn}(x')\cdot(a_2\cdot x'^2+(1-a_2)\cdot |x'|) \tag{32}$$

$$y=g_2(y')=\text{sgn}(y')\cdot(b_2\cdot y'^2+(1-b_2)\cdot |y'|) \tag{33}$$

The function f(x) may be represented as polynomial equations, such as provided in equations (19) and/or (20). If the function f(x) is represented as polynomial equations (such as provided in equation (19) and/or (20)), and/or f(0) is equal to 0 and/or f(1) is equal to 1, equations (19) and/or (20) may be provided as:

$$x'=f_1(x)=\text{sgn}(x)\cdot(a_2\cdot x^2+(1-a_2)\cdot |x|) \tag{34}$$

$$y'=f_2(y)=\text{sgn}(y)\cdot(b_2\cdot y^2+(1-b_2)\cdot |y|) \tag{35}$$

The search for the parameter $a_2$ and $b_2$ in equations (34) and/or (35) may be the same, or substantially similar to, the search for equation (32) and/or (33), e.g., as shown in FIG. 14 and FIG. 15.

As shown in Equation (31), the conversion distortion may be considered. One or more (e.g., different) transform functions may influence the regularity of the generated motion field in that face. The transform function, which may not have the best conversion distortion, may lead to a smooth motion field. Such smooth motion field may be good for coding, but using Equation (31), that may consider (e.g., only consider) conversion loss, the encoder may select the coding-friendly transform function. The parameters of the HYBCMP/ENH-HYBCMP may be derived by minimizing a Lagrangian target function which may jointly consider the impact on the conversion distortion and/or the regularity of the motion field. For example, the problem may be formulated as:

$$\operatorname{argmin}\sum_{i=0}^{5}\left(D_M^i(S_{org}^i, S_{rec}^i) + \lambda \cdot RMV^i\right) \tag{36}$$

where $RMV^i$ may represent the measurement for the regularity of the motion field in the i-th face, which may be calculated as the variance of the motion vector in a face. A may be the weighting factor for the trade-off of conversion distortion and the regularity of motion field. To obtain the motion field of a face in the frame-packed picture, one or more (e.g., different) methods may be applied. For example, block-matching based motion estimation may be applied to derive the motion field for a face. In this method, the projection picture in a face may be partitioned into one or more (e.g., multiple) blocks with a fixed block size (e.g., 32×32, 64×64, and so forth. For a block, the block-matching based search may be applied, which may compare the difference (e.g., sum of absolute distortion (SAD), sum of transformed absolute distortion (SATD)) for the target block with a candidate block that may be within a search range around the collocated position of the target block in the neighboring picture. The motion vector of the block may be calculated as the displacement for the target block and its reference block which may minimize the matching distortion. The gradient-based motion estimation may be applied which may provide a sample-based motion field by using the temporal and/or spatial gradient information of the samples within a face based on the famous optical-flow model.

A multi-pass encoding may be used to determine the parameters for a HYBCMP/ENH-HYBCMP face. The 360- degree video may be encoded by one or more passes and/or one or more (e.g., different) transform functions may be used in one or more (e.g., different) encoding passes. Transform functions (e.g., optimal transform functions) may be selected from the encoding pass which may provide the best performance in the terms of the R-D cost. To reduce the complexity, the parameters may be selected based on a number (e.g., small number) of pictures (e.g., the pictures in the first GOP) using the multi-pass encoding. The determined parameters may be re-used for one or more (e.g., the rest) of the pictures in the same sequence. To reduce the multipass encoding complexity, one or more sets of parameters may be selected as candidates. For example, one or more sets of parameters may be selected as candidates, as described herein. A set (e.g., a final set) of parameters may be selected. For example, a set (e.g., a final set) of parameters may be selected using an R-D cost of the encoding from the limited number of candidates, as described herein, and/or from one or more predefined parameter sets (e.g., CMP, UNICMP, ACP etc.).

In a pass encoding, the previous statistics may be used to change the parameters for future picture coding. For example, the coded motion filed at the same temporal level may be used to measure the regularity of motion filed. The conversion distortion may be calculated. If the cost combining conversion distortion and/or the regularity of motion field is greater than threshold, the parameters may be changed.

Figure 16A:
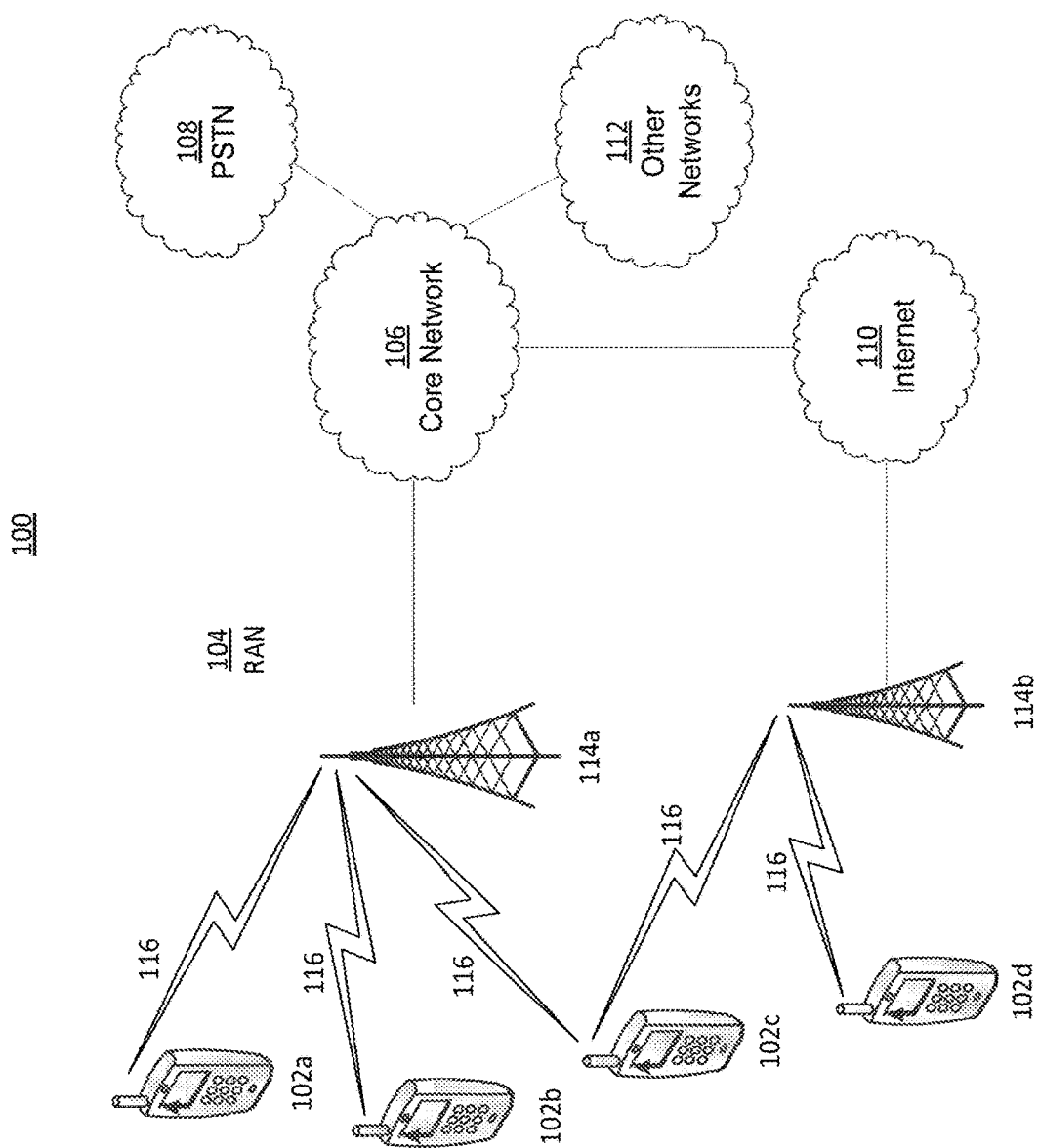
FIG. 16A is a system diagram illustrating an example communications system in which one or more disclosed embodiments may be implemented.

FIG. 16A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 16A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 16A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 16A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 16A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown)

employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 16A may be configured to communicate with the base station 114a, which may employ a cellular-based radio technology, and with the base station 114b, which may employ an IEEE 802 radio technology.

Figure 16B:
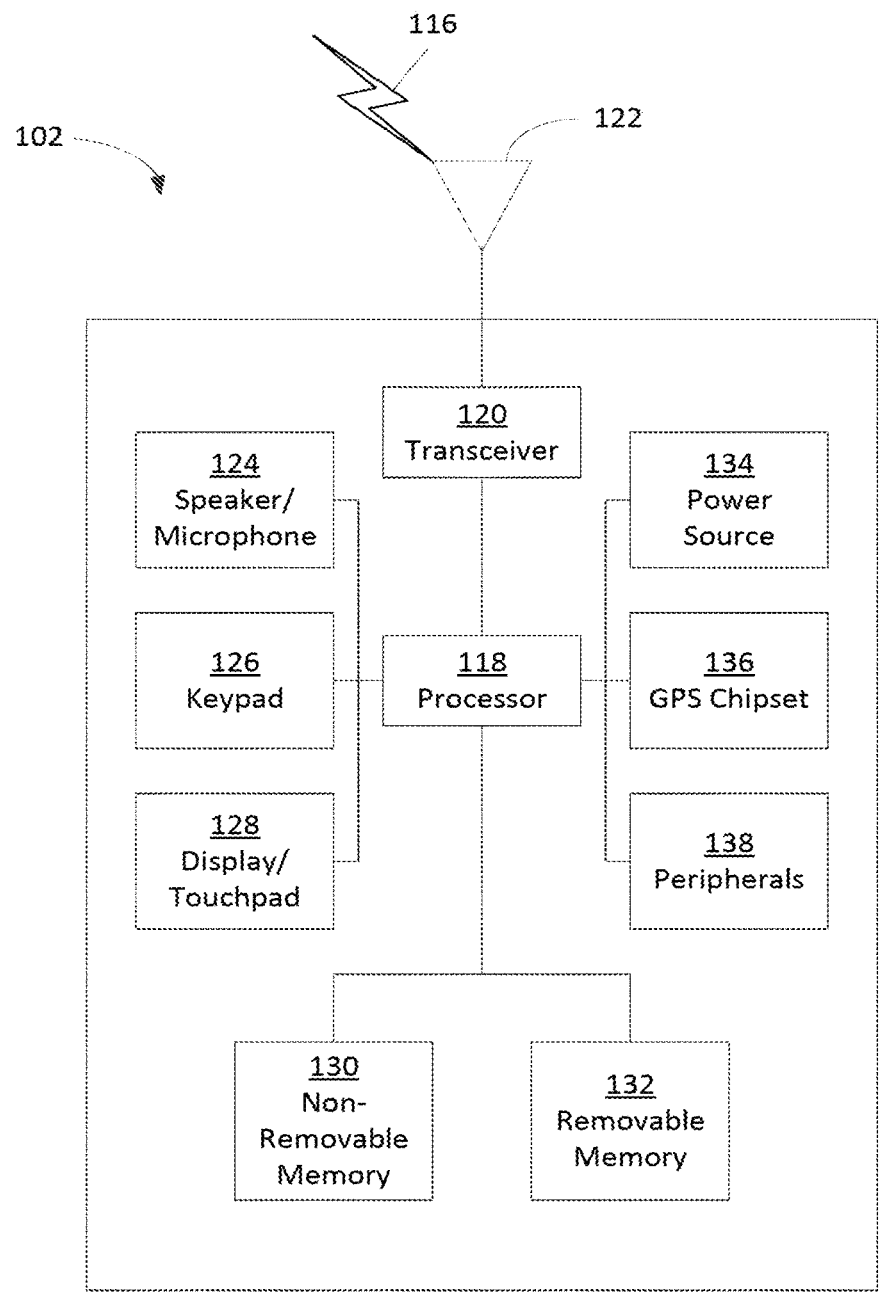
FIG. 16B is a system diagram illustrating an example wireless transmit/receive unit (WTRU) that may be used within the communications system illustrated in FIG. 16A.

FIG. 16B is a system diagram illustrating an example WTRU 102. As shown in FIG. 16B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 16B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 16B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 16C:
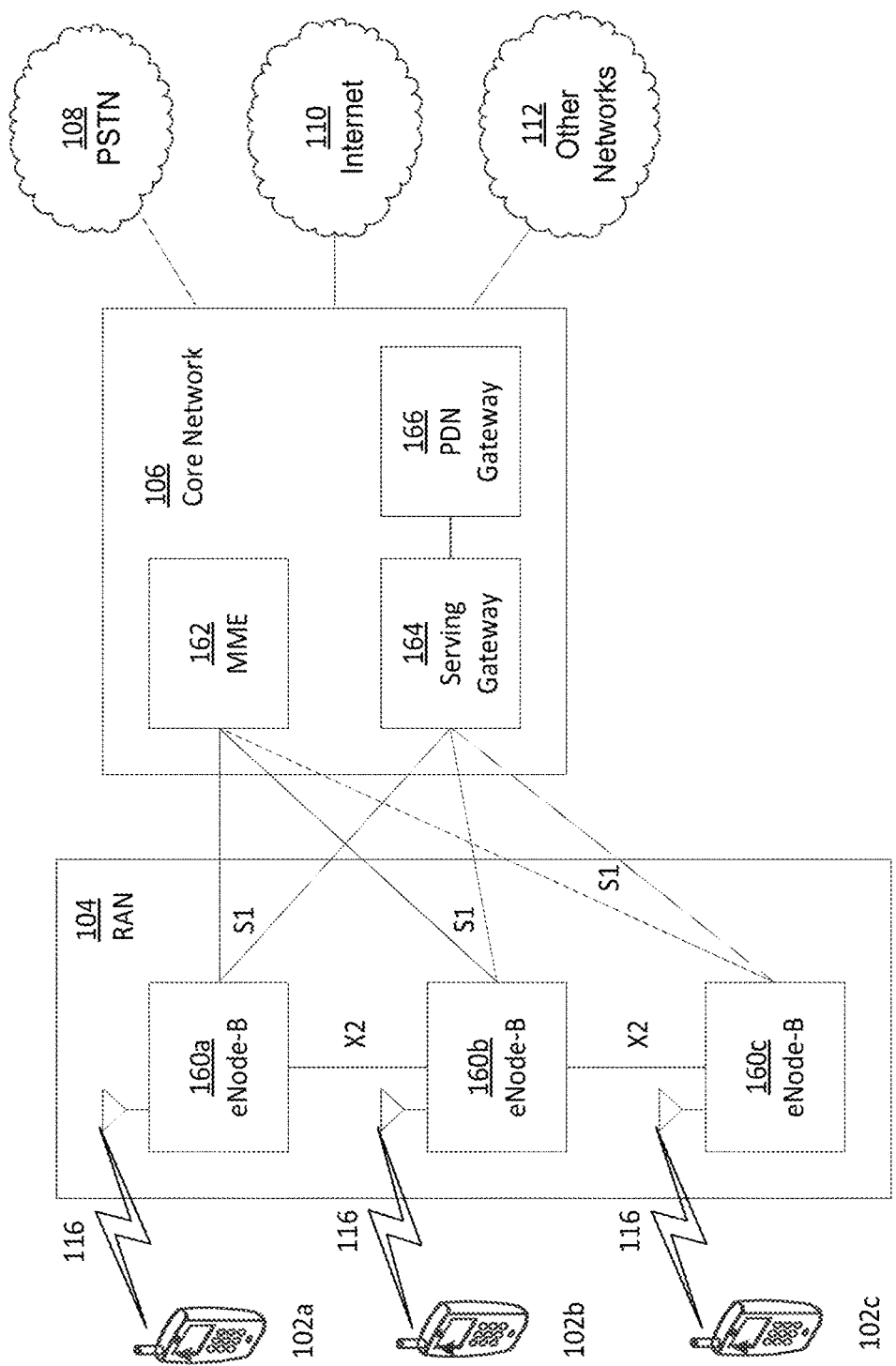
FIG. 16C is a system diagram illustrating an example radio access network (RAN) and an example core network (CN) that may be used within the communications system illustrated in FIG. 16A.

FIG. 16C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 16C, the eNode-Bs 160a, 160b, 160c may communicate with one another over an X2 interface.

The CN 106 shown in FIG. 16C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 16A-16D as a wireless terminal, it is contemplated that in certain representative embodiments that such a terminal may use (e.g., temporarily or permanently) wired communication interfaces with the communication network.

In representative embodiments, the other network 112 may be a WLAN. A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 16D:
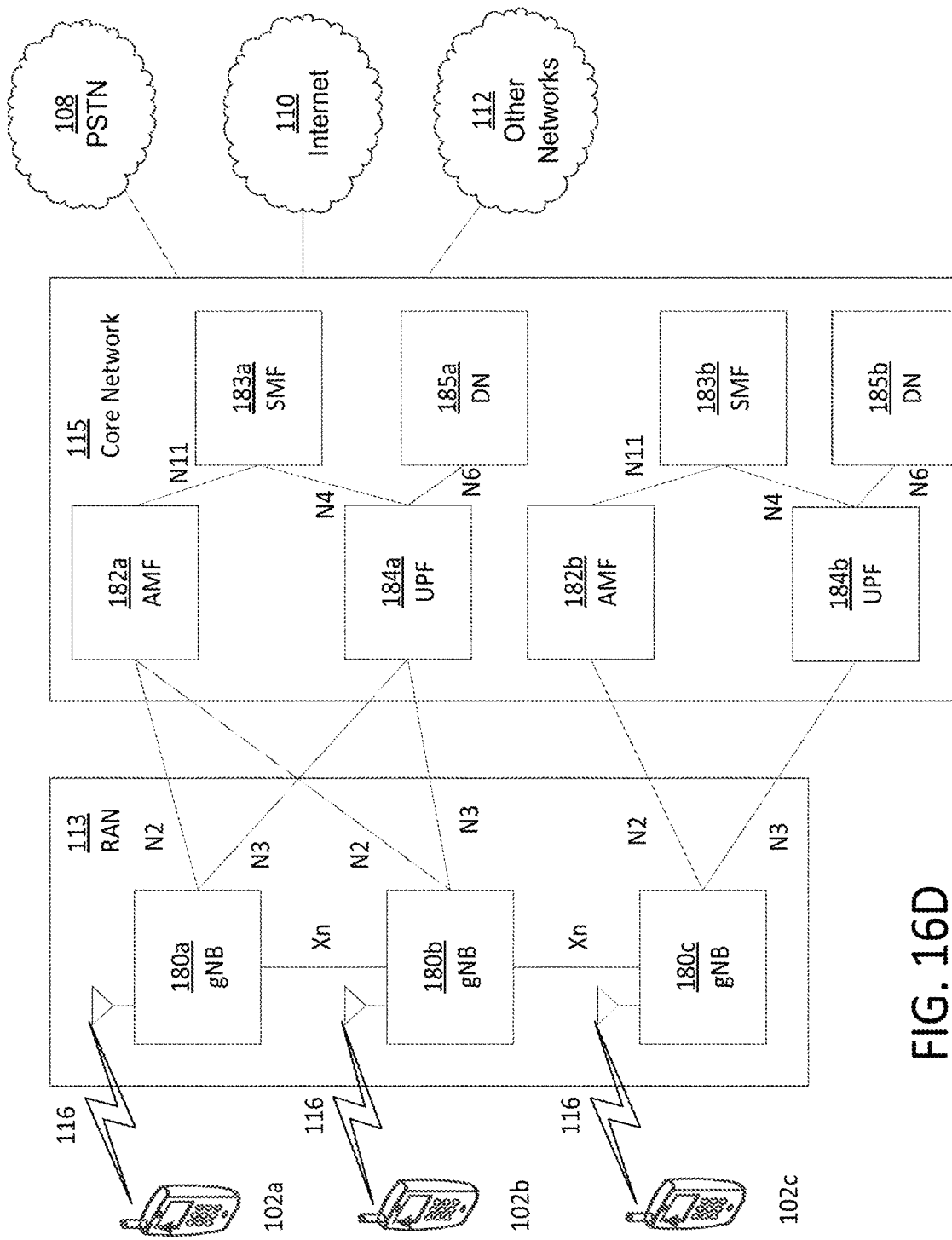
FIG. 16D is a system diagram illustrating a further example RAN and a further example CN that may be used within the communications system illustrated in FIG. 16A.

FIG. 16D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 16D, the gNBs 180a, 180b, 180c may communicate with one another over an Xn interface.

The CN 115 shown in FIG. 16D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 16A-16D, and the corresponding description of FIGS. 16A-16D, one or more, or all, of the functions described herein with regard to one or more of WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although the features and elements described herein consider LTE, LTE-A, New Radio (NR), and/or 5G specific protocols, it should be understood that the features and elements described herein are not restricted to LTE, LTE-A, New Radio (NR), and/or 5G specific protocols and may also be applicable to other wireless systems.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of decoding an omnidirectional video, comprising:
    obtaining a picture of an omnidirectional video, the picture comprising a first face and a first projection format corresponding to the first face;
    determining whether the first face is in a first user-defined projection format based on a first projection format indication associated with the first face;
    obtaining, based on the first face being in the first user-defined projection format, a horizontal transform function coefficient for a horizontal direction of the first face and a vertical transform function coefficient for a vertical direction of the first face;
    determining, based on the horizontal transform function coefficient, a horizontal transform function associated with the first face;
    determining, based on the vertical transform function coefficient, a vertical transform function associated with the first face; and
    performing at least one decoding process on the first face using the horizontal transform function and the vertical transform function.

2. The method of claim 1, wherein the at least one decoding process comprises performing a geometry padding of reference samples of the first face.

3. The method of claim 1, wherein the horizontal transform function coefficient and the vertical transform function coefficient for the first face are received at a sequence level.

4. The method of claim 1, wherein performing the at least one decoding process on the first face using the horizontal transform function and the vertical transform function comprises converting the first face of the picture to a target geometry using the horizontal transform function and the vertical transform function.

5. The method of claim 1, further comprising:
    wherein the picture comprises a plurality of faces associated with a plurality of projection formats;
    wherein the method further comprises:
    obtaining a third transform function associated with a second face of the plurality of faces;
    obtaining a fourth transform function associated with a third face of the plurality of faces; and
    performing at least one decoding process on the second face using the third transform function and performing the at least one decoding process on the third face using the fourth transform function.

6. The method of claim 5, further comprising:
    obtaining a second projection format indication that indicates a second projection format is associated with the second face and a third projection format indication that indicates a third projection format is associated with the third face, wherein the second projection format is different than the third projection format; and
    sending the second projection format indication and the third projection format indication.

7. The method of claim 6,
    wherein the second projection format and the third projection format comprise at least one of a cubemap (CMP) format, a uni-cube map projection (UNICMP) format, an adjusted cube map projection (ACP) format, or an equi-angular cubemap projection (EAC) format.

8. A method of encoding an omnidirectional video, comprising:
    obtaining a picture of an omnidirectional video, the picture comprising a plurality of faces;
    associating a user-defined projection format with a first face;
    determining, based on the first face being associated with the user-defined projection format, a horizontal transform function for a horizontal direction of the first face and a vertical transform function for a vertical direction of the first face;
    determining, based on the horizontal transform function, a horizontal transform function coefficient for the horizontal direction of the first face;
    determining, based on the vertical transform function, a vertical transform function coefficient for the vertical direction of the first face; and
    sending the omnidirectional video and an indication of the user-defined projection format, an indication of the horizontal transform function, an indication of the horizontal transform function coefficient, an indication of the vertical transform function, and an indication of the vertical transform function coefficient.

9. The method of encoding of claim 8,
    wherein sending an indication of the user-defined projection format, the indication of the horizontal transform function, the indication of the horizontal transform function coefficient, the indication of the vertical transform function, and the indication of the vertical transform function coefficient, comprises sending, associated with an indication of the first face, the indication of the horizontal transform function, the indication of the horizontal transform function coefficient, the indication of the vertical transform function, and the indication of the vertical transform function coefficient.

10. The method of claim 8, wherein sending the indication of the horizontal transform function, the indication of the horizontal transform function coefficient, the indication of the vertical transform function, and the indication of the vertical transform function coefficient comprises sending, at a sequence level, the indication of the horizontal transform function, the indication of the horizontal transform function coefficient, the indication of the vertical transform function, and the indication of the vertical transform function coefficient.

11. The method of claim 8, wherein the horizontal transform function and the vertical transform function are adapted for converting the first face to a target geometry.

12. The method of claim 8,
    associating a first transform function with a second face of the plurality of faces;
    associating a second transform function with a third face of the plurality of faces; and
    sending an indication that the first transform function is associated with the second face and an indication that the second transform function is associated with the third face.

13. The method of claim 12, further comprising:
    determining a first projection format indication that indicates a first projection format is associated with the second face and a second projection format indication that indicates a second projection format is associated with the third face, wherein the first projection format is different than the second projection format; and
    sending the first projection format indication and the second projection format indication.

14. The method of claim 12, further comprising:
    determining coefficients associated with the first transform;

sending an indication of the coefficients associated with the first transform;
determining coefficients associated with the second transform; and
sending an indication of the coefficients associated with the second transform.

15. An encoding device, comprising:
a processor configured to:
obtain a picture of an omnidirectional video, the picture comprising a plurality of faces;
associate a user-defined projection format with a first face;
determine, based on the first face being associated with the user-defined projection format, a horizontal transform function for a horizontal direction of the first face and a vertical transform function for a vertical direction of the first face;
determine, based on the horizontal transform function, a horizontal transform function coefficient for the horizontal direction of the first face;
determine, based on the vertical transform function, a vertical transform function coefficient for the vertical direction of the first face; and
send the omnidirectional video and an indication of the user-defined projection format, an indication of the horizontal transform function, an indication of the horizontal transform function coefficient, an indication of the vertical transform function, and an indication of the vertical transform function coefficient.

16. The encoding device of claim 15,
wherein the processor configured to send an indication of the user-defined projection format, the indication of the horizontal transform function, the indication of the horizontal transform function coefficient, the indication of the vertical transform function, and the indication of the vertical transform function coefficient, is configured to send, in association with an indication of the first face, the indication of the horizontal transform function, the indication of the horizontal transform function coefficient, the indication of the vertical transform function, and the indication of the vertical transform function coefficient.

17. The encoding device of claim 15,
wherein the processor configured to send the indication of the horizontal transform function, the indication of the horizontal transform function coefficient, the indication of the vertical transform function, and the indication of the vertical transform function coefficient, is configured to send, at a sequence level, the indication of the horizontal transform function, the indication of the horizontal transform function coefficient, the indication of the vertical transform function, and the indication of the vertical transform function coefficient.

18. The encoding device of claim 15, wherein the horizontal transform function and the vertical transform function are adapted for converting the first face to a target geometry.

19. The encoding device of claim 15,
wherein the processor is further configured to:
associate a first transform function with a second face of the plurality of faces;
associate a second transform function with a third face of the plurality of faces; and
send an indication that the first transform function is associated with the second face and an indication that the second transform function is associated with the third face.

20. The encoding device of claim 19,
wherein the processor is further configured to:
determine a first projection format indication that indicates a first projection format is associated with the second face and a second projection format indication that indicates a second projection format is associated with the third face, wherein the first projection format is different than the second projection format; and
send the first projection format indication and the second projection format indication.

21. A method of encoding an omnidirectional video, comprising:
obtaining a picture of an omnidirectional video, the picture comprising a plurality of faces;
associating a first transform function with a first face of the plurality of faces;
associating a second transform function with a second face of the plurality of faces;
sending the omnidirectional video; and
sending an indication that the first transform function is associated with the first face and an indication that the second transform function is associated with the second face.

22. The method of claim 21, further comprising:
determining a first projection format indication that indicates a first projection format is associated with the first face and a second projection format indication that indicates a second projection format is associated with the second face, wherein the first projection format is different than the second projection format; and
sending the first projection format indication and the second projection format indication.

23. The method of claim 21, further comprising:
determining coefficients associated with the first transform;
sending an indication of the coefficients associated with the first transform;
determining coefficients associated with the second transform; and
sending an indication of the coefficients associated with the second transform.

24. The method of claim 22,
wherein the first projection format and the second projection format comprise at least one of a cubemap (CMP) format, a uni-cube map projection (UNICMP) format, an adjusted cube map projection (ACP) format, or an equi-angular cubemap projection (EAC) format.

25. The method of claim 22, wherein the first projection format indication comprises an index value associated with a preconfigured projection format.

26. The method of claim 22, wherein sending the first projection format indication and the second projection format indication comprises sending the first projection format indication and the second projection format indication at a sequence level.

27. The method of claim 22,
wherein the first projection format indication indicates that the first face is in a user-defined format, and
wherein the method further comprises sending a horizontal transform function coefficient for a horizontal direction of the first face and a vertical transform function coefficient for a vertical direction of the first face.

28. The method of claim 21, further comprising:
sending a transform function type indication that indicates whether a transform function type in a horizontal direction of a face and a transform function type in a vertical direction of a face have a same value.

29. A encoding device, comprising:
a processor configured to:
obtain a picture of an omnidirectional video, the picture comprising a plurality of faces;
associate a first transform function with a first face of the plurality of faces;
associate a second transform function with a second face of the plurality of faces;
send the omnidirectional video; and
send an indication that the first transform function is associated with the first face and an indication that the second transform function is associated with the second face.

30. The encoding device of claim 29, wherein the processor is further configured to:
determine a first projection format indication that indicates a first projection format is associated with the first face and a second projection format indication that indicates a second projection format is associated with the second face, wherein the first projection format is different than the second projection format; and
send the first projection format indication and the second projection format indication.

31. The encoding device of claim 29, wherein the processor is further configured to:
determine coefficients associated with the first transform;
send an indication of the coefficients associated with the first transform;
determine coefficients associated with the second transform; and
send an indication of the coefficients associated with the second transform.

32. The encoding device of claim 30, wherein the processor configured to send the first projection format indication and the second projection format indication is further configured to send the first projection format indication and the second projection format indication at a sequence level.

33. The encoding device of claim 30,
wherein the first projection format indication indicates that the first face is in a user-defined format, and
wherein the processor is further configured to send a horizontal transform function coefficient for a horizontal direction of the first face and a vertical transform function coefficient for a vertical direction of the first face.

34. The encoding device of claim 33,
wherein the processor configured to send the horizontal transform function coefficient for the horizontal direction of the first face and the vertical transform function coefficient for the vertical direction of the first face is further configured to send the horizontal transform function coefficient for the horizontal direction of the first face and the vertical transform function coefficient for the vertical direction of the first face at a sequence level.

* * * * *